United States Patent
Izaki

(10) Patent No.: US 8,248,647 B2
(45) Date of Patent: Aug. 21, 2012

(54) PRINT CONTROL METHOD AND PRINTING APPARATUS

(75) Inventor: Osamu Izaki, Minato-ku (JP)

(73) Assignee: Oki Data Corporation, Tokyo (JP)

( * ) Notice: Subject to any disclaimer, the term of this patent is extended or adjusted under 35 U.S.C. 154(b) by 0 days.

(21) Appl. No.: 12/755,612

(22) Filed: Apr. 7, 2010

(65) Prior Publication Data

US 2010/0195154 A1  Aug. 5, 2010

Related U.S. Application Data

(62) Division of application No. 10/635,034, filed on Aug. 4, 2003, now abandoned.

(30) Foreign Application Priority Data

Aug. 13, 2002  (JP) ................. 2002-235578

(51) Int. Cl.
G06F 15/16 (2006.01)
H04N 1/00 (2006.01)

(52) U.S. Cl. ....... 358/1.15; 358/1.1; 358/1.13; 709/206; 709/217; 709/203; 370/349; 370/471

(58) Field of Classification Search ........ 358/1.13–1.18, 358/1.1, 1.6, 400–404; 718/100, 103–105; 709/203, 206, 217
See application file for complete search history.

(56) References Cited

U.S. PATENT DOCUMENTS

| | | | |
|---|---|---|---|
| 5,812,747 A | 9/1998 | Kayano et al. | |
| 5,854,693 A * | 12/1998 | Yoshiura et al. | 358/468 |
| 5,999,707 A | 12/1999 | Taniguchi et al. | |
| 6,307,640 B1 | 10/2001 | Motegi | |
| 6,369,909 B1 * | 4/2002 | Shima | 358/1.15 |
| 6,389,121 B1 * | 5/2002 | Terao | 379/100.08 |
| 6,519,048 B1 | 2/2003 | Tanaka | |
| 6,577,407 B1 | 6/2003 | Kopecki | |
| 6,667,810 B1 | 12/2003 | Jeyachandran et al. | |
| 6,822,754 B1 | 11/2004 | Shiohara | |
| 7,180,626 B1 * | 2/2007 | Gassho et al. | 358/1.6 |
| 7,187,461 B2 | 3/2007 | Schlonski et al. | |
| 7,283,272 B2 * | 10/2007 | Johnson et al. | 358/1.15 |
| 2001/0015812 A1 | 8/2001 | Sugaya | |
| 2001/0019425 A1 * | 9/2001 | Yamashita | 358/1.15 |
| 2002/0036793 A1 | 3/2002 | Roosen et al. | |
| 2002/0046238 A1 | 4/2002 | Estavillo et al. | |
| 2002/0135797 A1 * | 9/2002 | Al-Kazily et al. | 358/1.15 |
| 2002/0138564 A1 | 9/2002 | Treptow et al. | |
| 2002/0140986 A1 * | 10/2002 | Takayama | 358/402 |
| 2002/0140989 A1 * | 10/2002 | Shinchi et al. | 358/402 |
| 2002/0143924 A1 * | 10/2002 | Iga | 709/223 |
| 2002/0181019 A1 | 12/2002 | Christodoulou et al. | |
| 2003/0197887 A1 * | 10/2003 | Shenoy et al. | 358/1.15 |

* cited by examiner

*Primary Examiner* — Twyler Haskins
*Assistant Examiner* — Chad Dickerson
(74) *Attorney, Agent, or Firm* — Panitch Schwarze Belisario & Nadel LLP

(57) ABSTRACT

A system includes a host; a transfer source apparatus; and one or more transfer destination apparatus. The host is configured to send a transfer information command to the transfer source apparatus for instructing the transfer source apparatus to transfer data to the at least one transfer destination apparatus, and to further send the transfer information command to the transfer destination apparatus. The transfer destination apparatus is configured to send confirmation information to the transfer source apparatus after receiving the transfer information command from the host. The transfer source apparatus is configured to start transferring the data to the transfer destination apparatus after receiving the confirmation information from the transfer destination apparatus.

2 Claims, 30 Drawing Sheets

| SENDER ADDRESS |
|---|
| TO: 1ST PRINTING APPARATUS |
| CC: 2ND PRINTING APPARATUS |
| CC: 3RD PRINTING APPARATUS |
| SUBJECT: PRINT TRANSFER INSTRUCTION |
| JOB=1<br>ID="12345"<br>PW="abcdefg"<br>JOB=3<br>JOB=10<br>PW="qwertyuiop" |

Fig.12

MESSAGE OF INQUIRY MAIL

```
JOB LIST REQUEST
```

MESSAGE OF PRINT INSTRUCTION MAIL

```
JOB=1
ID="12345"
PW="abcdefg"
JOB=3
JOB=10
PW="dwertyuiop"
```

Fig.13

| | |
|---|---|
| JOB NO. | JOB = JOB NO. |
| HOST INFORMATION | |
| HOST I/F NAME | HOST = "HOST I/F NAME" |
| HOST NAME | HN = "HOST NAME" |
| IN THE CASE OF IP ADDRESS | HN = "IP: IP ADDRESS" |
| QUEUE NAME | QN = "QUEUE NAME" |
| JOB ID | ID = "JOB ID" |
| PASSWORD | PW = "*OF THE NUMBER AS MANY AS THE NUMBER OF DIGITS OF PASSWORD" |
| EMULATION | EMULATION = "EMULATION" |

*Fig.14*

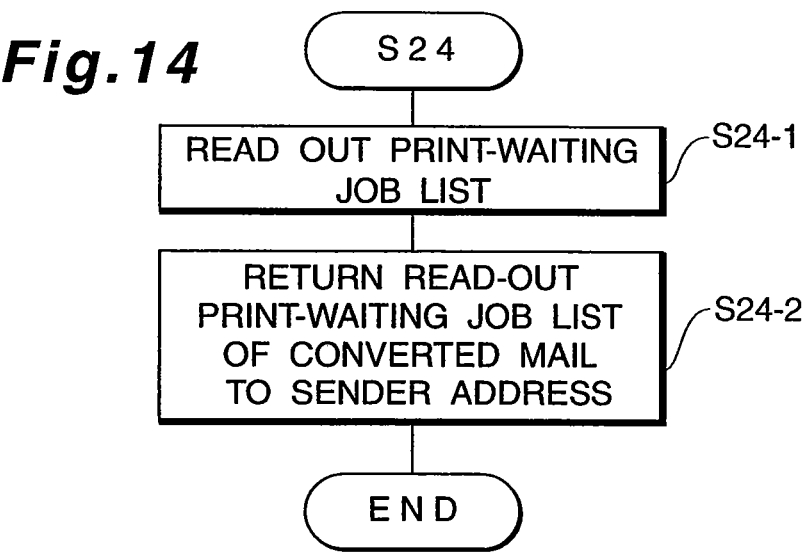

```
S24
↓
READ OUT PRINT-WAITING
JOB LIST                    — S24-1
↓
RETURN READ-OUT
PRINT-WAITING JOB LIST
OF CONVERTED MAIL           — S24-2
TO SENDER ADDRESS
↓
END
```

*Fig.15*

```
JOB=1
HOST="NETWORK"
PROTOCOL="1PR"
HN="IP:123.45.67.01"
ID="12345"
PW="******"
EMULATION="PS"
JB=2
HOST="PARALLEL"
ID="67890"
PW="**********"
EMULATION="PS"
JB=3
HOST="USB"
EMULATION="PCL"
JOB=4
HOST="NETWORK"
PROTOCOL="NETWARE"
HN="qube"
QN="dept1"
EMULATION="PS"
```

- MESSAGE OF INQUIRY MAIL

JOB LIST REQUEST

- MESSAGE OF PRINT INSTRUCTION MAIL

USER="Suzuki Taro"
UPW="zxcvbn"
JOB=1
ID="12345"
PW="abcdefg"
JOB=3
JOB=10
PW="qwertyuiop"

| THE NUMBER OF USERS |
| --- |
| USER NAME 1 |
| USER NAME 1 PASSWORD |
| USER NAME 2 |
| USER NAME 2 PASSWORD |
| ⋮ |
| USER NAME n |
| USER NAME n PASSWORD |

Fig.26

```
JOB=1
HOST="NETWORK"
PROTOCOL="1PR"
HN="IP:123.45.67.01"
ID="12345"
PW="*****"
EMULATION="PS"
PRINT PREVIEW FILE OF JOB1
JOB=2
HOST="PARALLEL"
ID="67890"
PW="*********"
EMULATION="PS"
PRINT PREVIEW FILE OF JOB2
JOB=3
HOST="USB"
EMULATION="PCL"
PRINT PREVIEW FILE OF JOB3
JOB=4
HOST="NETWORK"
PROTOCOL="NETWARE"
HN="QUBE"
QN="DEPTL"
EMULATION="PS"
PRINT PREVIEW FILE OF JOB4
```

Fig.30

MESSAGE OF INQUIRY MAIL

```
JOB LIST REQUEST
```

MESSAGE OF PRINT INSTRUCTION MAIL

```
JOB =1
ID="12345"
PW="abcdefg"
JOB =3
JOB =10
PW="qwertyuiop"
```

MESSAGE OF TRANSFER INSTRUCTION MAIL

```
TO="IP:123.45.67.11"
TO="IP:123.45.67.12"
JOB =1
ID="12345"
PW="abcdefg"
JOB =3
JOB =10
PW="qwertyuiop"
```

| SENDER ADDRESS |
|---|
| TO: 1ST PRINTING APPARATUS |
| CC: 2ND PRINTING APPARATUS |
| CC: 3RD PRINTING APPARATUS |
| SUBJECT: PRINT TRANSFER INSTRUCTION |

JOB=1
ID="12345"
PW="abcdefg"
JOB=3
JOB=10
PW="qwertyuiop"

- MESSAGE OF INQUIRY MAIL

```
JOB LIST REQUEST
```

- MESSAGE OF PRINT INSTRUCTION MAIL

```
JOB=1
ID="12345"
PW="abcdefg"
JOB=3
JOB=10
PW="qwertyuiop"
```

- MESSAGE OF RECEPTION CONFIRMATION MAIL

```
JOB ACCEPTED
PROTOCOL="1PR"
HN="IP:123.45.67.89"
```

PRINT CONTROL METHOD AND PRINTING APPARATUS

CROSS-REFERENCE TO RELATED APPLICATIONS

This application is a divisional of U.S. patent application Ser. No. 10/635,034, filed Aug. 4, 2003, and the disclosure of which is incorporated herein by reference.

BACKGROUND OF THE INVENTION

1. Field of the Invention

The invention relates to a print control method and a printing apparatus.

2. Related Background Art

Hitherto, in a printing apparatus connected to information processing apparatuses such as a plurality of computers or the like by a network, operators of the information processing apparatuses can confirm information regarding print-waiting print jobs before the print jobs are executed.

For example, there has been proposed a shared printing apparatus such that an information processing apparatus which is operated by a print instructor is notified of information regarding the print-waiting print jobs which have been received from the information processing apparatus and stored in storing means, thereby enabling the print instructor to confirm the information regarding the print jobs before printing is started (refer to JP-A-2000-81959). In this case, after confirming file names, charge information as estimation information, a print processing time, a sheet size, a sheet type, resolution, an output type, the number of output sheets, and the like which are included in the information regarding the print jobs, the print instructor can execute the print jobs.

There has also been proposed a printing apparatus such that an information processing apparatus which is operated by a receiver is notified of a fact that print jobs transmitted by other operators or print jobs transmitted by third parties by a facsimile apparatus or the like have been received (refer to JP-A-2001-51813). In this case, since the printing apparatus executes the print jobs after it receives an execution instruction from a legal receiver, it is possible to prevent persons other than the legal receiver from knowing print contents.

However, in the above conventional printing apparatuses, it is a prerequisite that the print instructor or the receiver grasps the contents of the print jobs and has a will to execute the print jobs. However, for example, there is a case where when a plurality of print-waiting print jobs exist, it is necessary to execute the print jobs of high priorities first and execute the rest of the print jobs later. There is also a case where it is necessary to execute only the print jobs of high priorities and cancel the rest of the print jobs.

In such a case, in the above conventional printing apparatuses, the information which is notified to the information processing apparatus operated by the print instructor or the receiver is not sufficient. Therefore, the print instructor or the receiver cannot discriminate the necessary print jobs from a plurality of print jobs on the basis of such insufficient information.

BRIEF SUMMARY OF THE INVENTION

It is an object of the invention to solve the problems of the foregoing conventional printing apparatuses and to provide a print control method and a printing apparatus, in which it is possible to easily select necessary print jobs from a plurality of print jobs and print only print data of the selected print jobs.

According to the invention, the above object is accomplished by a printing apparatus comprising: storing means which stores print data; printing means which prints the print data onto a medium; reply means which returns a list regarding the print data stored in the storing means to a host in response to an inquiry received from the host; and print instructing means which allows the printing means to print the print data stored in the storing means in response to a print instruction from the host.

In the concrete, a print control method is provided. The print control method comprises the steps of:

receiving data transmitted by an external apparatus; analyzing the received data;

storing the print data into a storing unit if the data is print data as a result of the analysis;

forming information regarding the print data stored in the storing unit and transmitting it to a sender of the inquiry data if the data is inquiry data as a result of the analysis; and selecting the print data stored in the storing unit on the basis of the print instruction data and printing if the data is print instruction data as a result of the analysis.

The method may further comprises a step which collates whether the data whose printing has been instructed by the print instruction data has been stored in the storing unit or not, and wherein the coincident print data is printed if the coincident data is searched by the collation.

Also, the method may further comprises the steps of:

developing the print data and converting it into a format in which the data can be displayed by the external apparatus;

storing the data converted into the format in which the data can be displayed in an interlocking relation with the print data; and transmitting the information regarding the print data stored in the storing unit and the data converted into the format in which the data can be displayed if the inquiry data is received.

In this case, in the step which converts the data into the data in the format in which the data can be displayed, the data of only a first page is converted.

Also, the method may further comprises the steps of:

detecting that information of another external apparatus is included in the print instruction data; and transferring the print data instructed by the print instruction data to the another external apparatus if the information of the another external apparatus is included.

Also, the method may further comprises the steps of:

detecting that information of another external apparatus is included in the print instruction data;

receiving a reply from the another external apparatus if the information of the another external apparatus is included; and transferring the print data instructed by the print instruction data to the another external apparatus if the reply is received.

Also, the method may further comprises the steps of:

detecting that information of its own apparatus and information of another external apparatus are included in the print instruction data; and transmitting a reply to the another external apparatus if the information of the another external apparatus and the information of the own apparatus are included.

Also, the method may further comprises the steps of:

detecting whether information of storage designation or print designation exists in the print data received from the external apparatus or not; and printing the print data irrespective of the print instruction data if the information indicates the print designation.

Also, the method may further comprises the steps of:

receiving authentication data from the external apparatus and storing it;

comparing authentication data included in the data which is transmitted from the external apparatus with the stored authentication data; and executing a process corresponding to the received data if the data coincide as a result of the comparison.

In this case, the data which is compared in the step which compares the authentication data may be user data or may be password data.

Also, in the method, in the step which analyzes the received data, a predetermined character train included in the received data is detected.

Also, in the method, in the step which transmits the inquiry data to the sender, the information is transmitted to the external apparatus by E-mail.

Also, in the method, in the step which receives the data transmitted by the external apparatus, E-mail transmitted by the external apparatus is received.

Also, the method, in the step which forms the information regarding the print data stored in the storing unit, information which can identify each of the stored print data is formed. In this case, the identification information in the step which forms the information regarding the print data stored in the storing unit is a job number.

Further, a printing apparatus is provided. The printing apparatus comprises:

a receiving unit which receives data from a host;

a transmitting unit which transmits data to the host;

a print unit which prints print data onto a medium;

an analyzing unit which analyzes the data received from the host;

a storing unit which stores the print data if a result of the analysis indicates the print data;

a list forming unit which forms a list of the print data stored in the storing unit and outputs it to the transmitting unit if the result of the analysis indicates inquiry data; and a print instructing unit which, if the result of the analysis indicates print instruction data, outputs the print data stored in the storing unit to the print unit on the basis of the print instruction data.

Other features and advantages of the present invention will be apparent from the following description taken in conjunction with the accompanying drawings, in which like reference characters designate the same or similar parts throughout the figures thereof.

BRIEF DESCRIPTION OF THE SEVERAL VIEWS OF THE DRAWINGS

FIG. 12 is a diagram showing a message of the received mail in the first embodiment of the invention;

FIG. 13 is a diagram showing a case where the print-waiting job list in the first embodiment of the invention has been converted into E-mail;

FIG. 14 is a flowchart showing the operation of an inquiry mail process in the first embodiment of the invention;

FIG. 15 is a diagram showing a message of reply mail in the first embodiment of the invention;

FIG. 26 is a diagram showing a message of reply mail including a print preview and an attachment file in the first embodiment of the invention;

FIG. 30 is a diagram showing a message of received mail in the second embodiment of the invention;

DETAILED DESCRIPTION OF THE INVENTION

Embodiments of the invention will be described in detail herein below with reference to the drawings.

Figure 1:
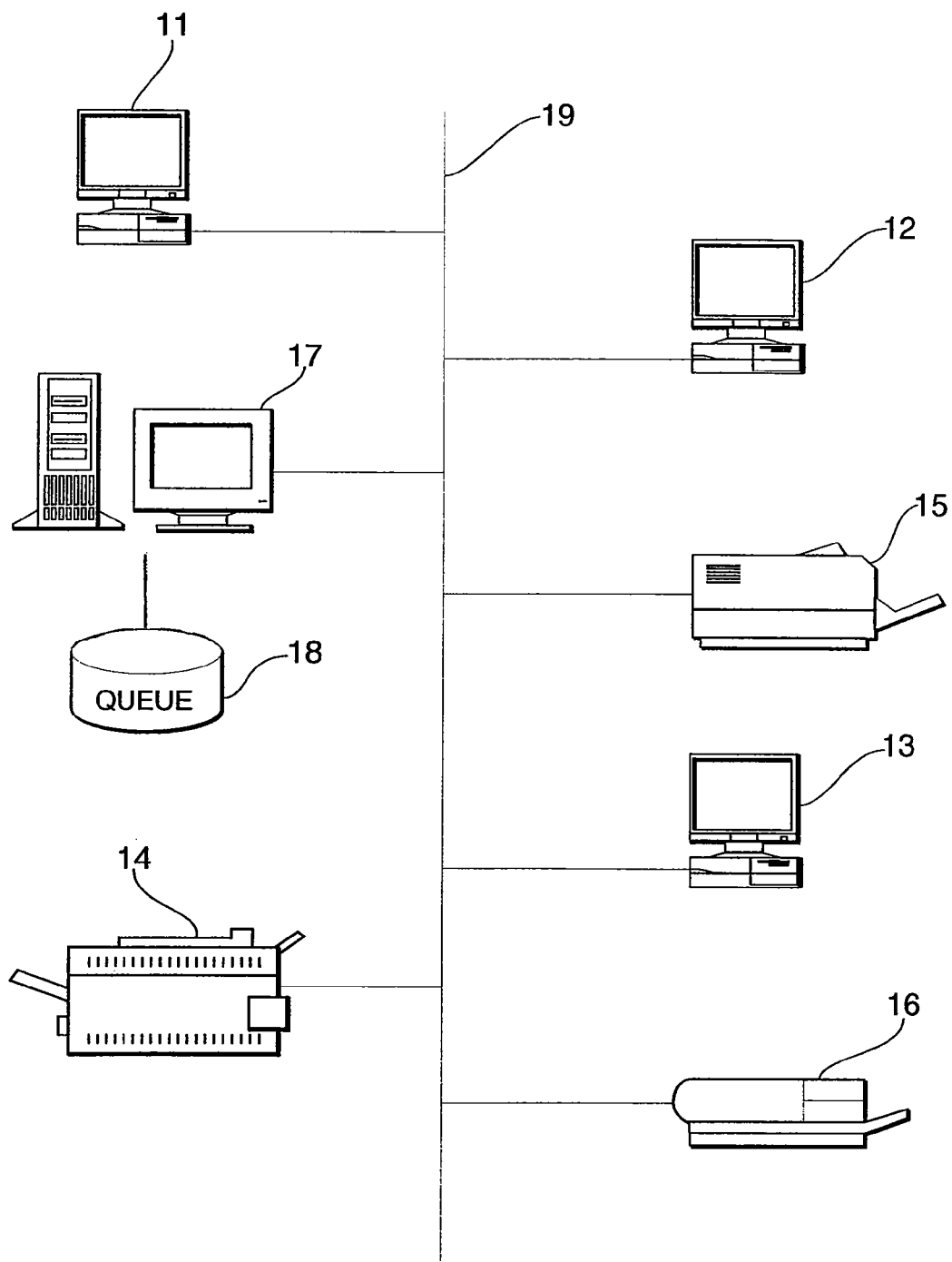
FIG. 1 is a diagram showing a print system in the first embodiment of the invention.

FIG. 1 is a diagram showing a print system in the first embodiment of the invention.

In the diagram, reference numerals 11 to 13 denote first to third hosts for transmitting print jobs including print data to first to third printing apparatuses 14 to 16 or transmitting a print instruction to the first to third printing apparatuses 14 to 16 directly or via a first server 17, respectively. Each of the first to third hosts 11 to 13 is a computer comprising: arithmetic operating means such as CPU, MPU, or the like; storing means such as semiconductor memory, magnetic disk, or the like; input means such as keyboard, mouse, or the like; display means such as CRT, liquid crystal display, or the like; a communication interface; and the like. A personal computer, a workstation, a personal digital assistant, and the like can be mentioned as examples of the 1st to 3rd hosts 11 to 13, but any type of computer can be used. The first server 17 is also a computer comprising: arithmetic operating means such as CPU, MPU, or the like; storing means such as semiconductor memory, magnetic disk, or the like; input means such as keyboard, mouse, or the like; display means such as CRT, liquid crystal display, or the like; a communication interface; and the like. Further, each of the first to third printing apparatuses 14 to 16 is a printer comprising: a print engine which prints print data onto a medium such as paper or the like; an engine controller which controls the print engine; a communication interface; and the like. A printer of an electrophotographic system, an ink jet printer, an ink ribbon printer, and the like can be mentioned as examples of the 1st to 3rd printing apparatuses 14 to 16, but any type of printer can be used.

In the print system shown in FIG. 1, the 1st to 3rd hosts 11 to 13, the 1st server 17, and the 1st to 3rd printing apparatuses 14 to 16 are connected so that they can communicate with each other via a network 19. The 1st server 17 stores the print jobs received from the 1st to 3rd hosts 11 to 13 into a queue 18 serving as storing means and, thereafter, transmits them to the 1st to 3rd printing apparatuses 14 to 16, respectively.

Subsequently, a hardware construction of each of the 1st to 3rd printing apparatuses 14 to 16 will be described.

Figure 2:
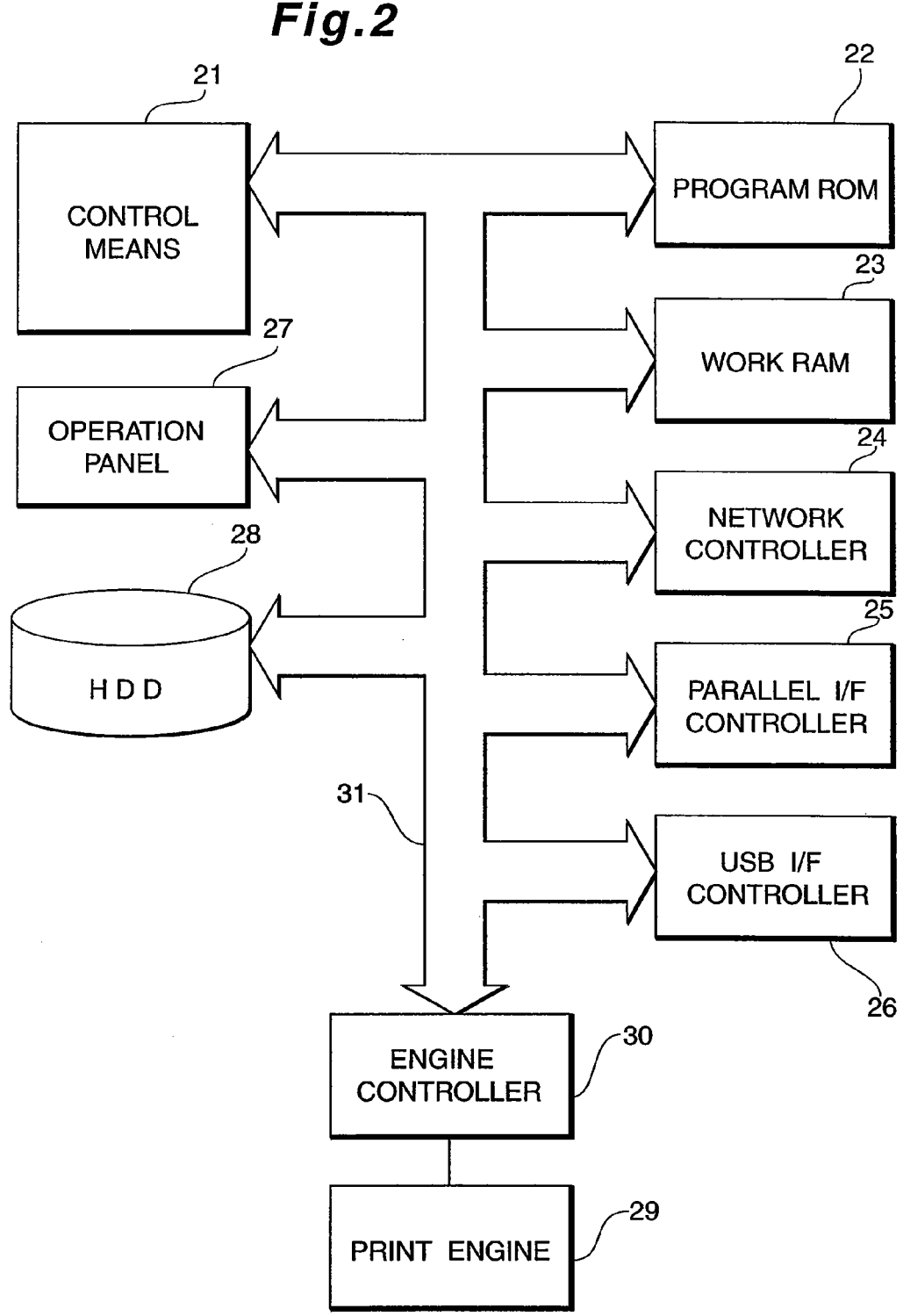
FIG. 2 is a block diagram showing a construction of hardware of a printing apparatus in the first embodiment of the invention.

FIG. 2 is a block diagram showing a construction of hardware of the printing apparatus in the first embodiment of the invention.

In the diagram, reference numeral 21 denotes control means such as CPU, MPU, or the like which controls the operations of the 1st to 3rd printing apparatuses 14 to 16; 22 a program ROM serving as storing means in which a control program is stored; 23 a work RAM serving as storing means in which work information is temporarily stored; 24 a network controller for making communication with the network 19; 25 a parallel OF (interface) controller for making communication with the hosts; 26 a USB OF controller for making communication with the hosts; and 28 an HDD (Hard Disk Drive) serving as storing means which stores the print data.

Reference numeral 27 denotes an operation panel for displaying statuses and making setting of the 1st to 3rd printing apparatuses 14 to 16. The operation panel 27 comprises: input means such as push buttons, touch panel, or the like; and display means such as CRT, liquid crystal display, LED (Light Emitting Diode) display, or the like. Reference numeral 29 denotes a print engine serving as printing means which prints the print data onto the medium such as paper or the like. A toner image forming apparatus of the electrophotographic system, an ink jet head, and the like can be mentioned as examples of such a print engine, but an apparatus of any print system can be used. Reference numeral 30 denotes an engine controller serving as print instructing means which allows the print engine 29 to print the print data. The control means 21, program ROM 22, work RAM 23, network controller 24, parallel OF controller 25, USB OF controller 26, operation panel 27, HDD 28, and engine controller 30 are connected so that they can communicate with each other via a bus 31.

Subsequently, a software construction of each of the 1st to 3rd printing apparatuses 14 to 16 will be described.

Figure 3:
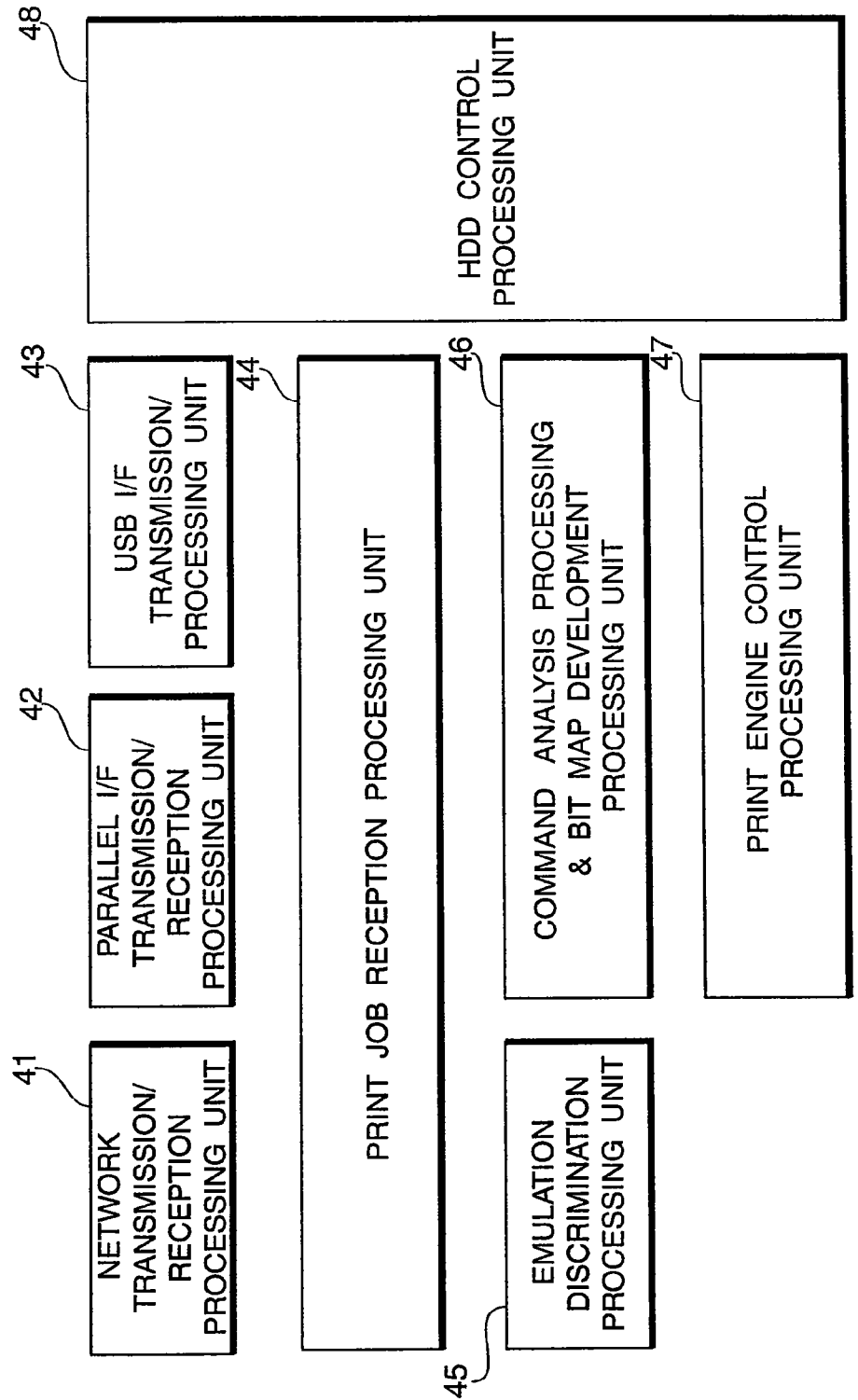
FIG. 3 is a block diagram showing a construction of software of the printing apparatus in the first embodiment of the invention.

FIG. 3 is a block diagram showing a construction of software of the printing apparatus in the first embodiment of the invention.

In the diagram, reference numeral 41 denotes a network transmission/reception processing unit for transmitting and receiving the data from the network 19; 42 a parallel OF transmission/reception processing unit for transmitting and receiving the data from the parallel UF; 43 a USB OF transmission/reception processing unit for transmitting and receiving the data from the USB UF; 44 a print job reception processing unit for processing the received print job; 45 an emulation discrimination processing unit for discriminating emulation of the print job; 46 a command analysis processing and bit map development processing unit serving as converting means which analyzes a command of the print job and develops it to a bit map; 47 a print engine control processing unit for controlling the print engine 29; and 48 an HDD control processing unit for controlling the reading and writing operations from/to the HDD 28.

Subsequently, a construction of the network transmission/reception processing unit 41 will be described.

Figure 4:
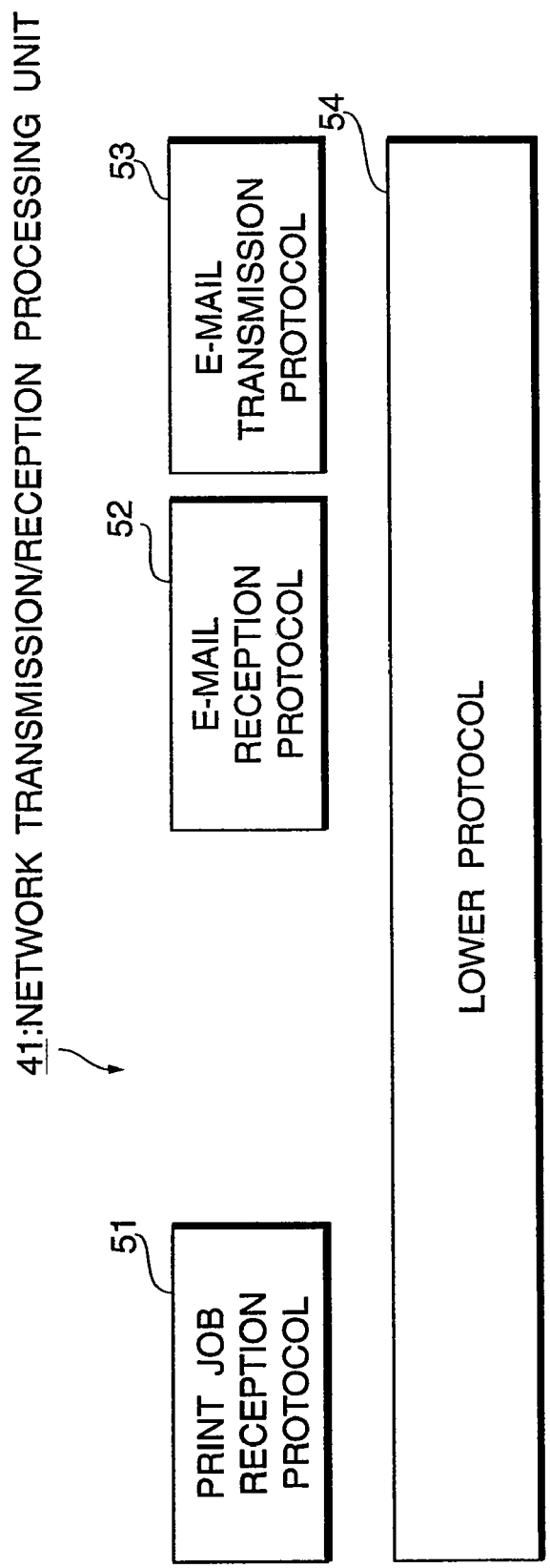
FIG. 4 is a block diagram showing a construction of a network transmission/reception processing unit in the first embodiment of the invention.

FIG. 4 is a block diagram showing a construction of the network transmission/reception processing unit in the first embodiment of the invention.

In the diagram, reference numeral 51 denotes a print job reception protocol for receiving the print job and 1 pd, NetWare (registered trademark), or the like can be mentioned as an example of such a protocol. Reference numeral 52 denotes an E-mail reception protocol for receiving E-mail and SMTP (Simple Mail Transfer Protocol), POP (Post Office Protocol) 3, or the like can be mentioned as an example of such a protocol. Reference numeral 53 denotes an E-mail transmission protocol for transmitting the E-mail and SMTP or the like can be mentioned as an example of such a protocol. Reference numeral 54 denotes a lower protocol which is necessary to realize those transmission and reception and TCP (Transmission Control Protocol)/IP (Internet Protocol), SPX/IPX, or the like can be mentioned as an example of such a protocol.

Subsequently, the operation of the printing apparatus with the above construction will be described. First, an outline of the operation will be explained.

Figure 5:
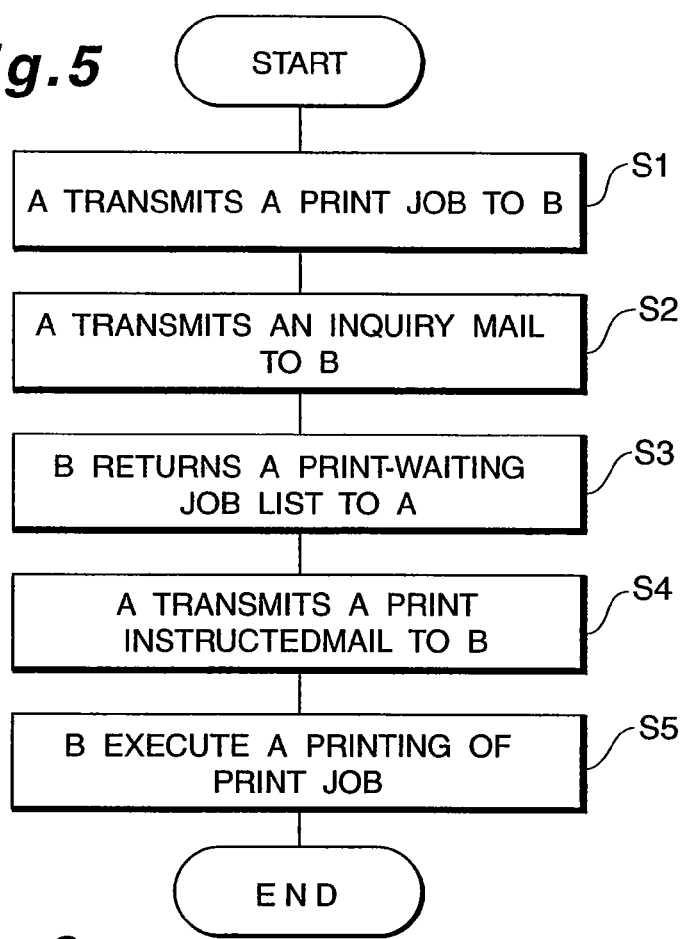
FIG. 5 is a flowchart showing the operation of the printing apparatus in the first embodiment of the invention.

FIG. 5 is a flowchart showing the operation of the printing apparatus in the first embodiment of the invention.

First, the user operates one of the first to third hosts 11 to 13, for example, the first host 11 and transmits the print job to one of the first to third printing apparatuses 14 to 16, for example, the first printing apparatus 14. The print job can be directly transmitted to the first printing apparatus 14 by the transmission protocol or after the print job is once stored into the queue 18 of the first server 17, it can be also transmitted from the first server 17 to the first printing apparatus 14.

Subsequently, the user transmits E-mail serving as an inquiry, that is, inquiry mail from the first host 11 to the first printing apparatus 14. The first printing apparatus 14 which received the inquiry mail returns a list regarding the print data stored in the HDD 28, that is, a list of the print-waiting jobs as E-mail to the first host 11 serving as an inquiring source.

Subsequently, on the basis of the contents of the E-mail returned to the first host 11, the user selects the print job for executing printing from the print-waiting job list and transmits print instruction mail to instruct the execution of the printing of the print job to the first printing apparatus 14. The first printing apparatus 14 which received the print instruction mail executes the printing of the designated print job.

Subsequently, a flowchart will be described.

Step S1: The print job is transmitted.
Step S2: The inquiry mail is transmitted.
Step S3: The print-waiting job list is returned.
Step S4: The print instruction mail is transmitted.
Step S5: The printing of the print job is executed and the processing routine is finished.

Subsequently, the operation of the print job receiving process as an operation at the time when the printing apparatus receives the print job will be described.

Figure 6:
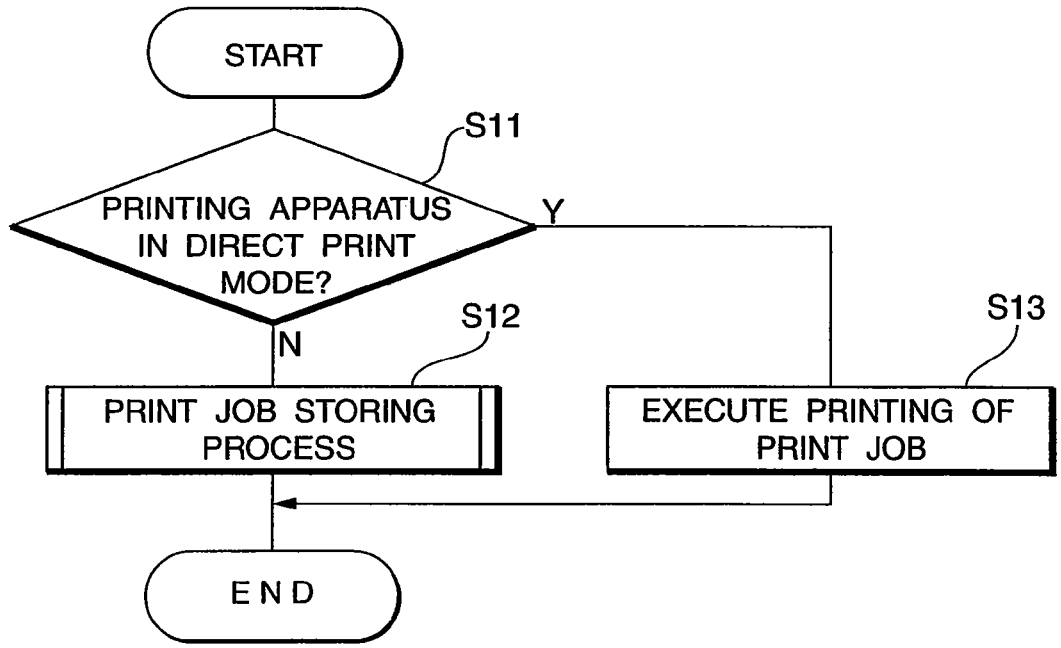
FIG. 6 is a flowchart showing the operation of a print job receiving process in the first embodiment of the invention.

FIG. 6 is a flowchart showing the operation of a print job receiving process in the first embodiment of the invention.

First, when the print job transmitted from one of the first to third hosts 11 to 13, for example, the first host 11 is received by one of the first to third printing apparatuses 14 to 16, for example, the first printing apparatus 14, the print job is received by the network transmission/reception processing unit 41 and transmitted to the print job reception processing unit 44.

The print job reception processing unit 44 discriminates whether the first printing apparatus 14 is in a direct print mode or not. It is assumed that discrimination reference about the direct print mode has been preset by a method whereby, for example, a mode designating command sent together with the print data is detected, or the user operates the operation panel 27 or the like. If the first printing apparatus 14 is in the direct print mode, the printing of the print job is executed as it is and the processing routine is finished. If it is not in the direct print mode, a print job storing process is executed.

Subsequently, a flowchart will be described.

Step S11: Whether the first printing apparatus 14 is in the direct print mode or not is discriminated. If it is in the direct print mode, step S13 follows. If it is not in the direct print mode, step S12 follows.

Step S12: The print job storing process is executed and the processing routine is finished.

Step S13: The printing of the print job is executed and the processing routine is finished.

Subsequently, the print job storing processing operation as an operation at the time when the printing apparatus stores the print job will be described.

Figure 7:
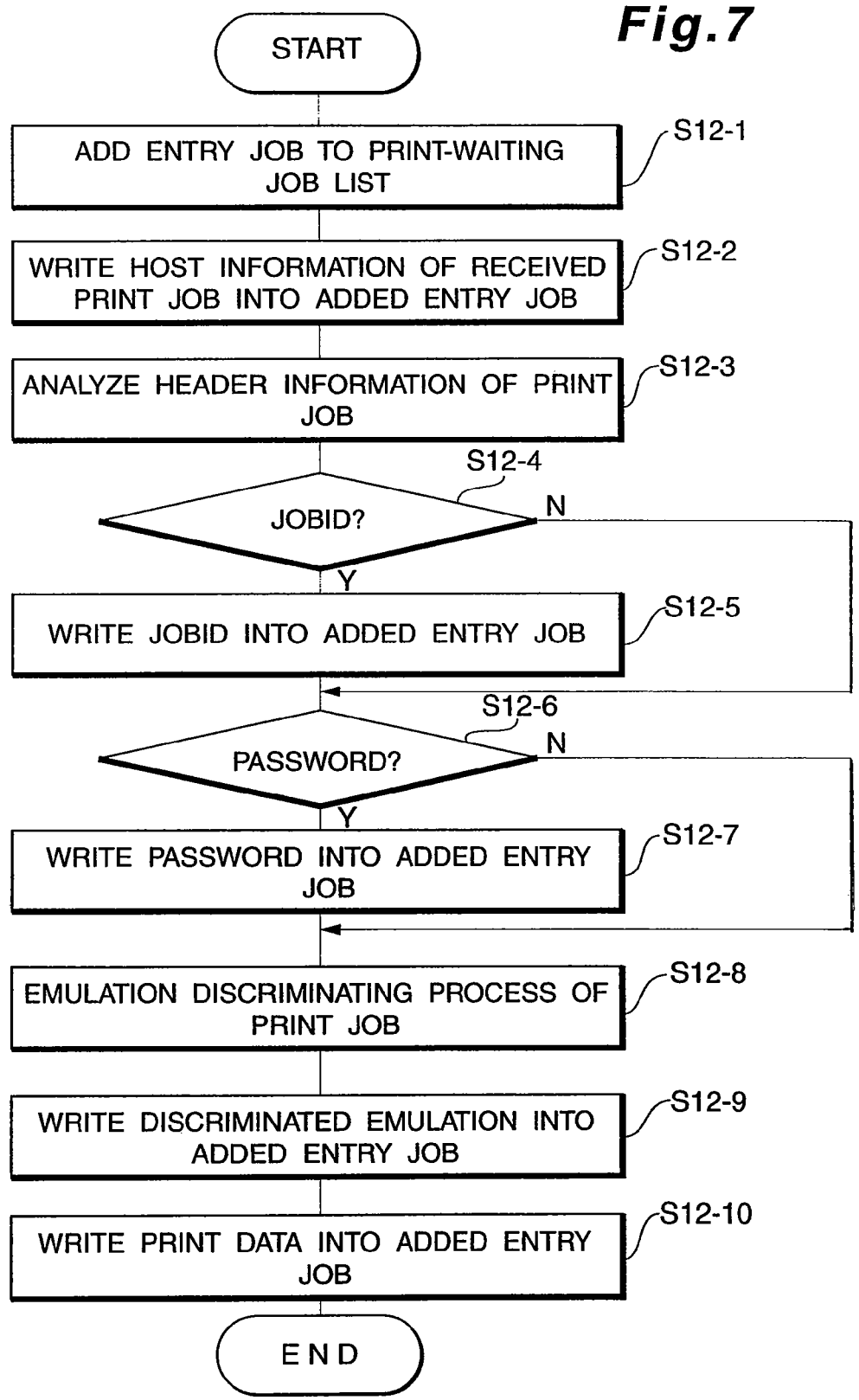
FIG. 7 is a flowchart showing a subroutine for a print job storing process in the first embodiment of the invention.
Figure 8:
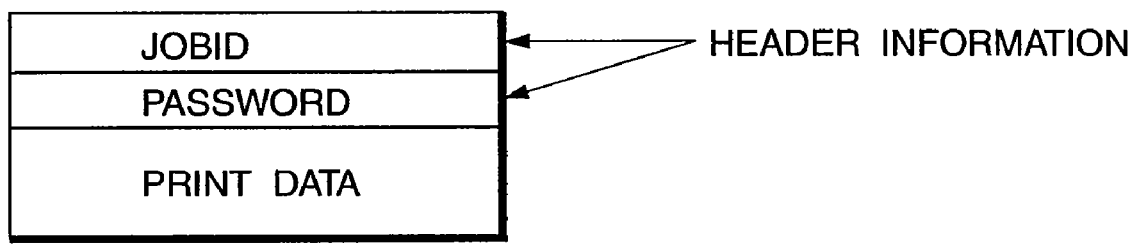
FIG. 8 is a diagram showing a print job in the first embodiment of the invention.

FIG. 7 is a flowchart showing a subroutine for the print job storing process in the first embodiment of the invention. FIG. 8 is a diagram showing the print job in the first embodiment of the invention. FIG. 9 is a diagram showing the print-waiting job list in the first embodiment of the invention.

Figure 9C:
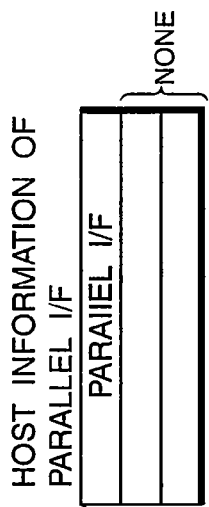
FIG. 9 is a diagram showing a list of print-waiting jobs in the first embodiment of the invention.
Figure 9D:
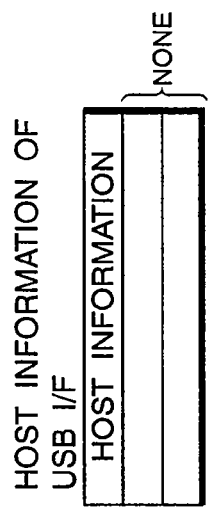
Figure 9E:
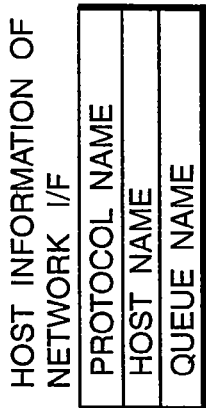

First, a new job is added as an entry job to the print-waiting job list in the HDD 28 in order to store the received print job. In this case, as shown in FIG. 9(a), a job n (n is a natural number) as an entry job is added to the end of the print-waiting job list and the number of jobs is incremented (increased by one).

Figure 9B:
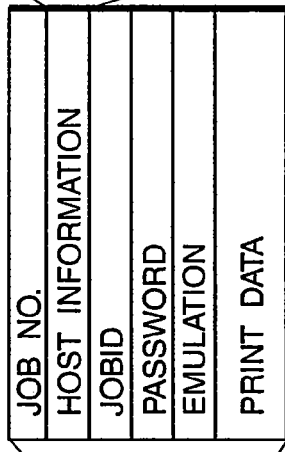
Figure 9A:
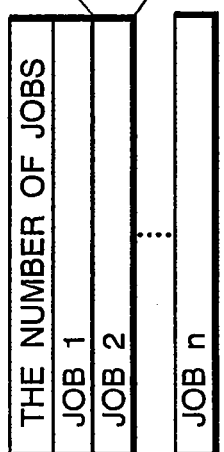

As shown in FIG. 9(b), attribute information (a job number, host information, a job ID, a password, emulation) and the print data can be stored in each job. The job number is a number which starts from 1 and is automatically increased each time the entry job is added. The host information has been predetermined in accordance with the type of host I/F. In the case of the parallel I/F or the USB I/F, as shown in FIGS. 9(c) and 9(d), only the name of the I/F or the host information is stored. In the case of the network I/F, as shown in FIG. 9(e), a name of the protocol (1 pd, NetWare (registered trademark), or the like) which received the print job, a host name (IP address or the like), and a queue name (there is also a case where there is no queue name in dependence on the protocol) are stored. Although the job ID and the password can be obtained from the print job, there is also a case where they do not exist in dependence on the print job. Further, the emulation can be obtained by analyzing the print data.

When a new entry is added, the host information is written into the entry job in accordance with the host I/F which received at this time. Subsequently, the presence or absence of the job ID and the password is discriminated on the basis of header information of the print job as shown in FIG. 8. If they exist, they are also written into the entry job. In the embodiment, in addition to the print data, the job ID and the password have been added as header information in the print job. In the embodiment, those header information is not indispensable.

Subsequently, an emulation discriminating process of the print job is executed. In the emulation discriminating process, the command or the like existing in the print data is analyzed, thereby deciding the emulation. The emulation obtained by the emulation discriminating process is also written into the entry job.

Finally, the print data in the print job is written into the entry job and the new-entry adding process to the print-waiting job list is finished.

If the printing apparatus receives an electric mail (E-mail) in this state, an electric mail receiving process is started.

Subsequently, a flowchart will be described.

Step S12-1: The entry job is added to the print-waiting job list in the HDD 28.

Step S12-2: The host information of the received print job is written into the added entry job in the HDD 28.

Step S12-3: The header information of the print job is analyzed.

Step S12-4: The presence or absence of the job ID is discriminated. If the job ID exists, step S12-5 follows. If the job ID does not exist, step S12-6 follows.

Step S12-5: The job ID is written into the added entry job in the HDD 28.

Step S12-6: The presence or absence of the password is discriminated. If the password exists, step S12-7 follows. If the password does not exist, step S12-8 follows.

Step S12-7: The password is written into the added entry job in the HDD 28.

Step S12-8: The emulation discriminating process of the print job is executed.

Step S12-9: The discriminated emulation is written into the added entry job in the HDD 28.

Step S12-10: The print data is written into the added entry job in the HDD 28 and the processing routine is finished.

Subsequently, the operation of the E-mail receiving process of the printing apparatus will be described.

Figure 10:
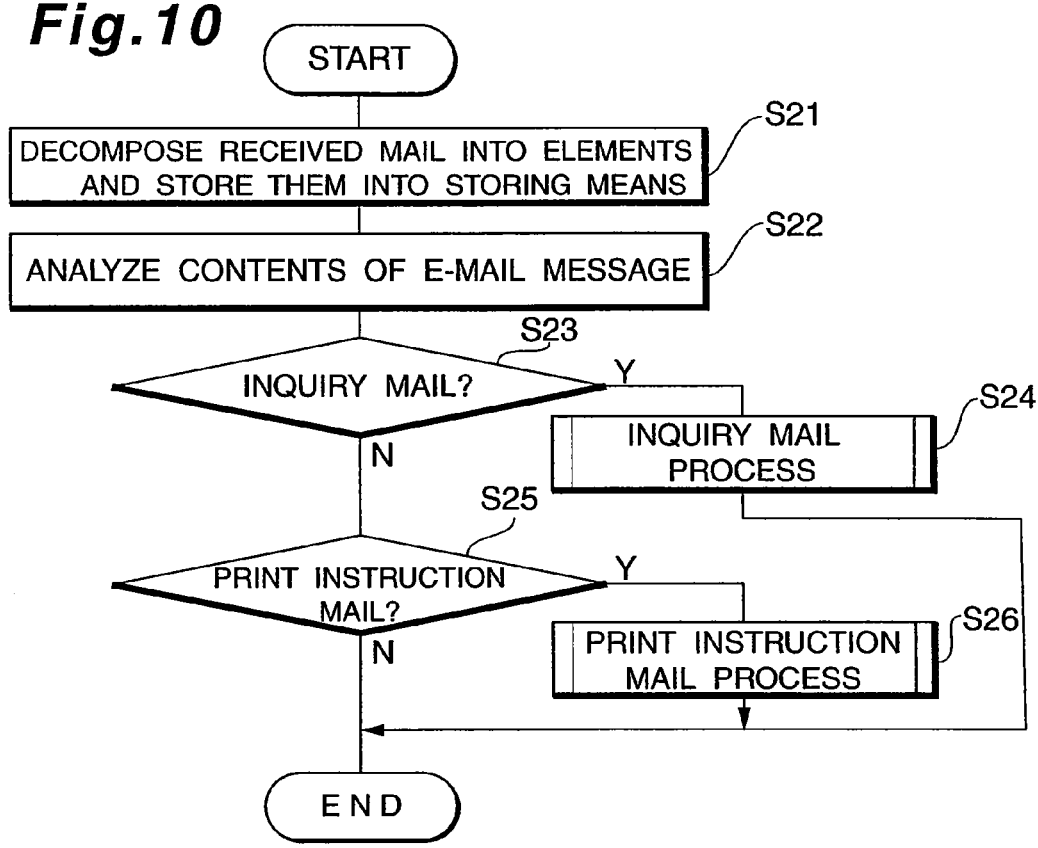
FIG. 10 is a flowchart showing the operation of an E-mail receiving process in the first embodiment of the invention.
Figure 11:
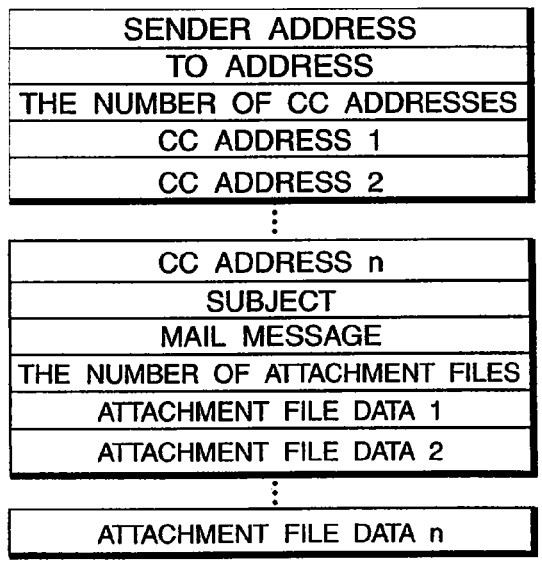
FIG. 11 is a diagram showing a structure of stored received mail in the first embodiment of the invention.

FIG. 10 is a flowchart showing the operation of the E-mail receiving process in the first embodiment of the invention. FIG. 11 is a diagram showing a structure of the stored received mail in the first embodiment of the invention. FIG. 12 is a diagram showing a message of the received mail in the first embodiment of the invention. FIG. 13 is a diagram showing a case where the print-waiting job list in the first embodiment of the invention has been converted into the E-mail.

In this case, since the received mail as received E-mail is constructed by a sender address, a TO (destination) address, a CC (carbon copy recipient) address, a subject, a mail message, and an attachment file, it is decomposed, converted into an internal format of the printing apparatus as shown in FIG. 11, and stored into the storing means such as work RAM 23, HDD 28, or the like of the printing apparatus.

Since the message of the received mail in the embodiment has contents as shown in FIG. 12, the received mail message is analyzed and whether the mail is inquiry mail or print instruction mail is discriminated. The inquiry mail is recognized by confirming that the mail message starts from "JOB LIST" and the print instruction mail is recognized by confirming that the mail message starts from "JOB=XX" (where, XX denotes a number). If it is the inquiry mail, an inquiry mail process is executed. If it is the print instruction mail, a print instructing process is executed.

A format of the E-mail message is substantially the same as that shown in FIG. 13 except for one point. The exceptional point is the password. In FIG. 13, * of the number as many as the number of digits of the password are inserted as contents. However, the password is inserted as contents of the received mail message shown in FIG. 12.

Subsequently, a flowchart will be described.

Step S21: The received mail is decomposed into elements and stored into the storing means.

Step S22: The contents of the received mail message are analyzed.

Step S23: Whether the received mail is the inquiry mail or not is discriminated. If it is the inquiry mail, step S24 follows. If it is not the inquiry mail, step S25 follows.

Step S24: The inquiry mail process is executed and the processing routine is finished.

Step S25: Whether the received mail is the print instruction mail or not is discriminated. If it is the print instruction mail, step S26 follows. If it is not the print instruction mail, the processing routine is finished.

Step S26: The print instruction mail process is executed and the processing routine is finished.

Subsequently, the operation of the inquiry mail process of the printing apparatus will be explained.

FIG. 14 is a flowchart showing the operation of the inquiry mail process in the first embodiment of the invention. FIG. 15 is a diagram showing the message of the reply mail in the first embodiment of the invention.

First, the print-waiting job list is read out from the HDD 28. The print-waiting job list as shown in FIG. 9 is converted into a reply mail format as shown in FIG. 15. In a specific converting procedure, as shown in FIG. 13, each item in the print-waiting job list is converted into a character train showing a type of item and a character train showing its contents.

The formed reply mail message is returned to the sender address of the stored received mail as shown in FIG. 11.

Subsequently, a flowchart will be explained.

Step S24-1: The print-waiting job list is read out from the HDD 28.

Step S24-2: The read-out print-waiting job list is converted into an electric mail and is returned to the sender address and the processing routine is finished.

Subsequently, the operation of a print instruction mail process of the printing apparatus will be explained.

Figure 16:
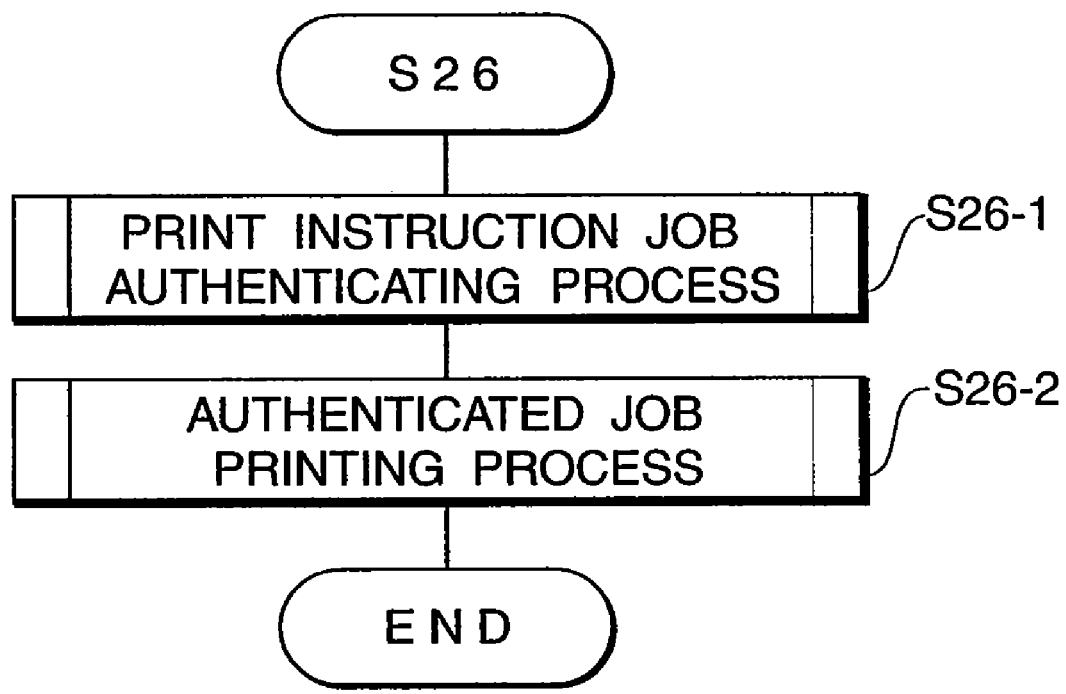
FIG. 16 is a flowchart showing the operation of a print instruction mail process in the first embodiment of the invention.

FIG. 16 is a flowchart showing the operation of the print instruction mail process in the first embodiment of the invention.

First, an authenticating process of a instructed print job is executed and the authenticated print jobs are extracted. After that, a printing process of an authenticated print job is executed and printing of the authenticated print job is executed.

Subsequently, a flowchart will be explained.

Step S26-1: The authenticating process of a instructed print job is executed.

Step S26-2: The printing process of an authenticated print job is executed and the processing routine is finished.

Subsequently, the operation of the print instruction job authenticating process of the printing apparatus will be described.

Figure 17:
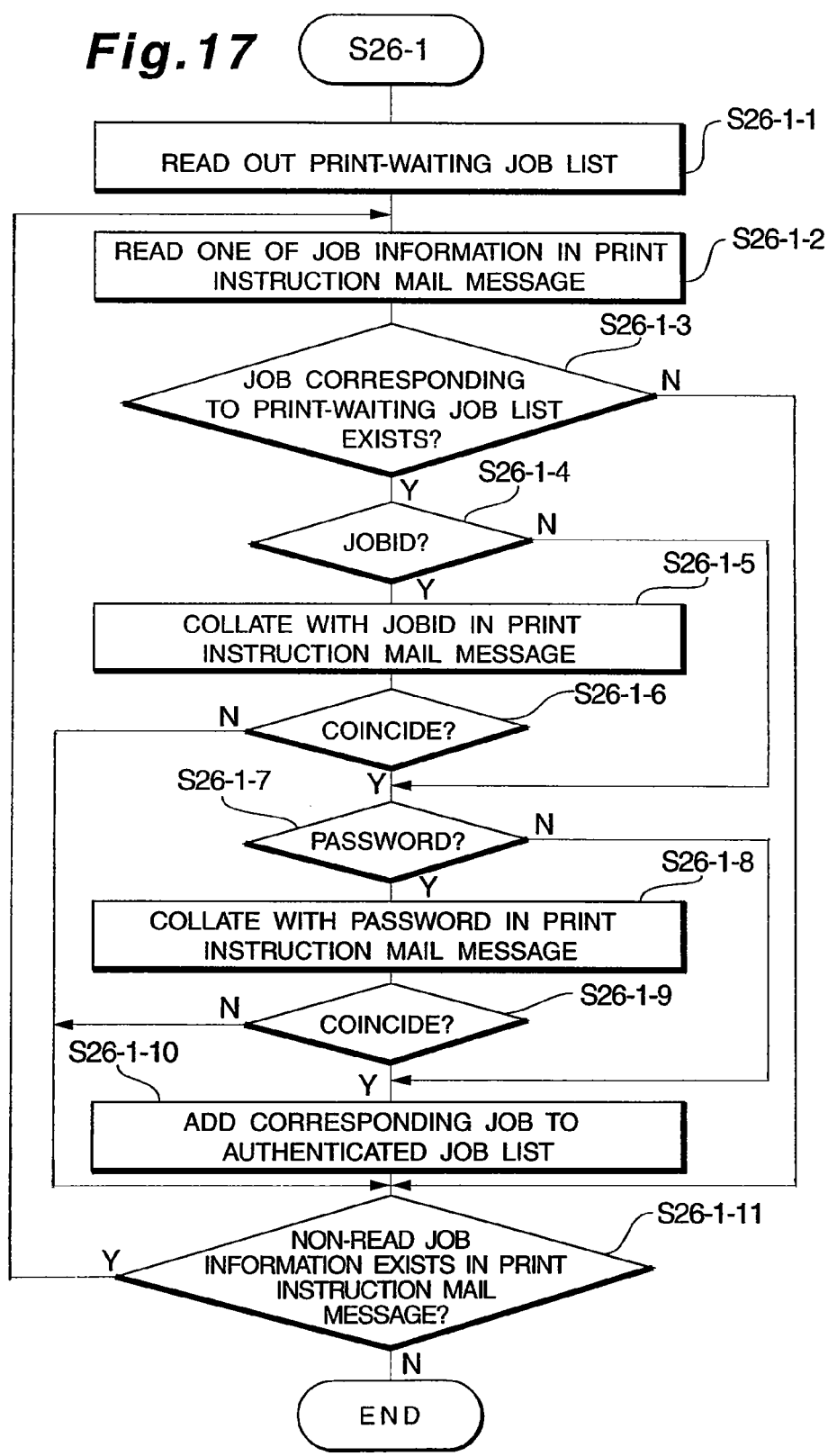
FIG. 17 is a flowchart showing the operation of a print instruction job authenticating process in the first embodiment of the invention.
Figure 18:
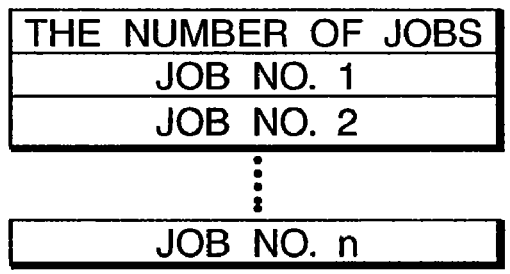
FIG. 18 is a diagram showing a list of authentication jobs in the first embodiment of the invention.

FIG. 17 is a flowchart showing the operation of the authenticating process of a instructed print job in the first embodiment of the invention. FIG. 18 is a diagram showing a list of authentication jobs in the first embodiment of the invention.

First, the print-waiting job list is read out from the HDD 28. Whether the corresponding print job exists in the print-waiting job list or not is discriminated on the basis of the job information in the print instruction mail message shown in FIG. 12. Such discrimination can be realized by comparing job numbers.

Subsequently, if the job ID and the password exist in the corresponding print job, they are collated with the job ID and the password in the print instruction mail message. If the information included in the print instruction mail does not coincide with the information included in the print job stored in the storing apparatus, that is, if either the job ID or the password does not coincide, the printing of such a print job is not executed by regarding it as an illegal print instruction and authentication of the next print job in the print instruction mail message is started.

If the job ID and the password coincide with them, the job number is added to an authentication job list shown in FIG. 18. Such processes are executed with respect to all print jobs existing in the print instruction mail message.

Subsequently, a flowchart will be explained.

Step S26-1-1: The print-waiting job list is read out from the HDD 28.

Step S26-1-2: One job information in the print instruction mail message is read out.

Step S26-1-3: Whether the corresponding print job exists in the print-waiting job list or not is discriminated. When a number of 1 or more has been stored in the number of jobs in the list, it is determined that the job exists.

That is, whether the print-waiting job exists or not is discriminated. If the corresponding print job exists, step S26-1-4 follows. If the corresponding print job does not exist, step S26-1-11 follows.

Step S26-1-4: Whether the job ID exists in the corresponding print job or not is discriminated. If the job ID exists, step S26-1-5 follows. If the job ID does not exist, step S26-1-7 follows.

Step S26-1-5: The job ID is collated with the job ID in the print instruction mail message. (This collating process is executed to all IDs stored in the job list.)

Step S26-1-6: Whether the job ID in the print instruction mail message coincides with one of the job IDs stored in the job list or not is discriminated. If they coincide, step S26-1-7 follows. If they do not coincide, step S26-1-11 follows.

Step S26-1-7: Whether the password exists in the corresponding print job or not is discriminated. If the password exists, step S26-1-8 follows. If the password does not exist, step S26-1-10 follows.

Step S26-1-8: The password is collated with that in the print instruction mail message.

Step S26-1-9: Whether the password coincides with the password in the print instruction mail message or not discriminated. If they coincide, step S26-1-10 follows. If they do not coincide, step S26-1-11 follows.

Step S26-1-10: The corresponding print job is added to the authentication job list.

Step S26-1-11: Whether the non-read job information exists in the print instruction mail message or not is discriminated. That is, whether all IDs whose printing has been instructed by the print instruction mail have been processed or not is discriminated. If the non-read job information exists, the processing routine is returned to step S26-1-2. If the non-read job information does not exist, the processing routine is finished.

Subsequently, the operation of the printing process of an authenticated print job of the printing apparatus will be described.

Figure 19:
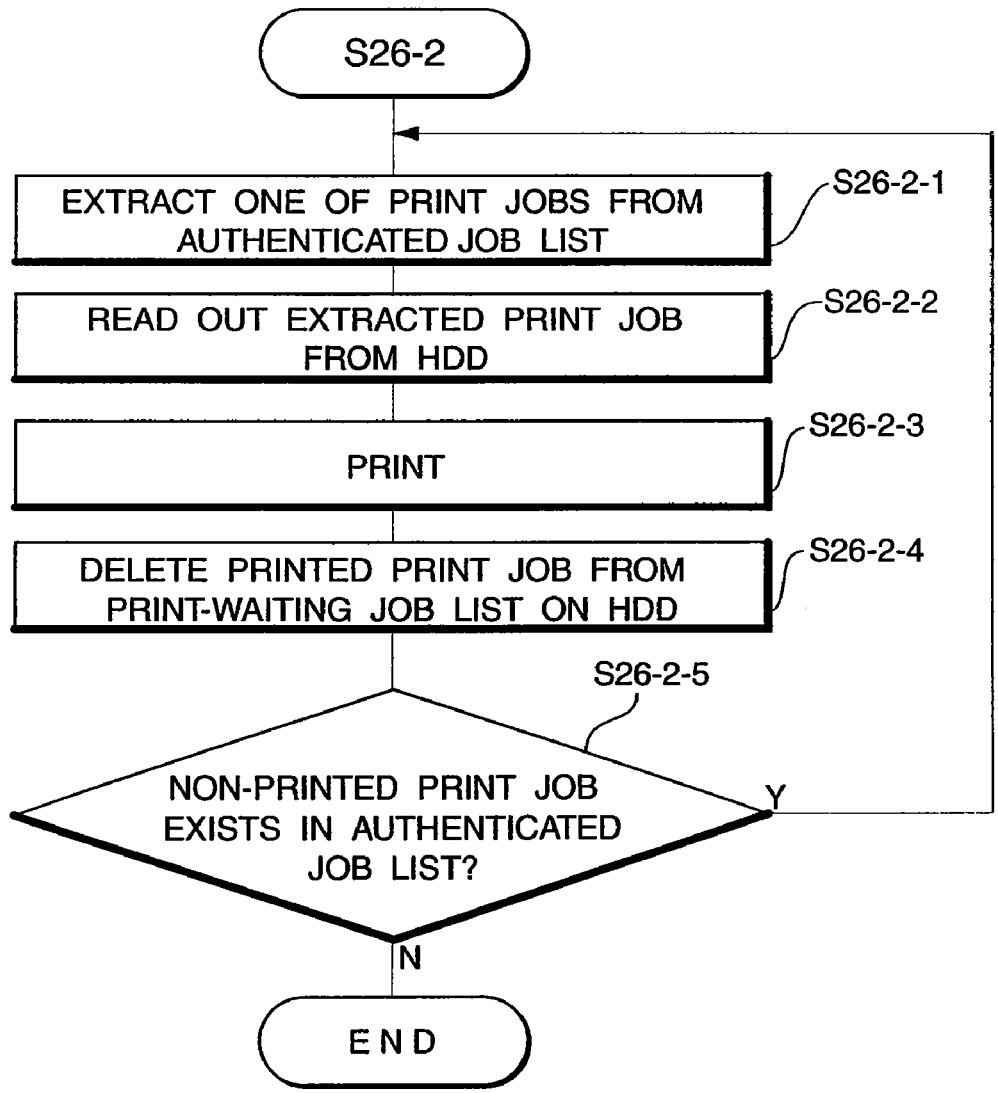
FIG. 19 is a flowchart showing the operation of an authentication job printing process in the first embodiment of the invention.

FIG. 19 is a flowchart showing the operation of the printing process of an authenticated print job in the first embodiment of the invention.

First, one print job is extracted from the authenticated job list shown in FIG. 18. The print data is extracted from the corresponding print job in the print-waiting job list in the HDD 28, and the printing is executed. Subsequently, the print job in which the printing has been finished is deleted from the print-waiting job list. Such processes are executed to all of the print jobs existing in the authenticated job list.

Subsequently, a flowchart will be explained.

Step S26-2-1: One print job number is extracted from the authenticated job list.

Step S26-2-2: The print job corresponding to the extracted number is read out from the print-waiting job list stored in the HDD 28.

Step S26-2-3: The printing is executed.

Step S26-2-4: The print job in which the printing has been finished is deleted from the print-waiting job list in the HDD 28.

Step S26-2-5: Whether the non-print print job exists in the authenticated job list or not is discriminated. If the non-print print job exists, the processing routine is returned to step S26-2-1. If the non-print print job does not exist, the processing routine is finished.

Thus, the print instruction of the print job stored in the HDD 28 of the printing apparatus can be made by using the standard E-mail function without changing the existing job print environment.

Subsequently, the operation in the case of confirming whether the print instruction has been transmitted by the registered user in the printing apparatus or not will be described.

Figure 20:
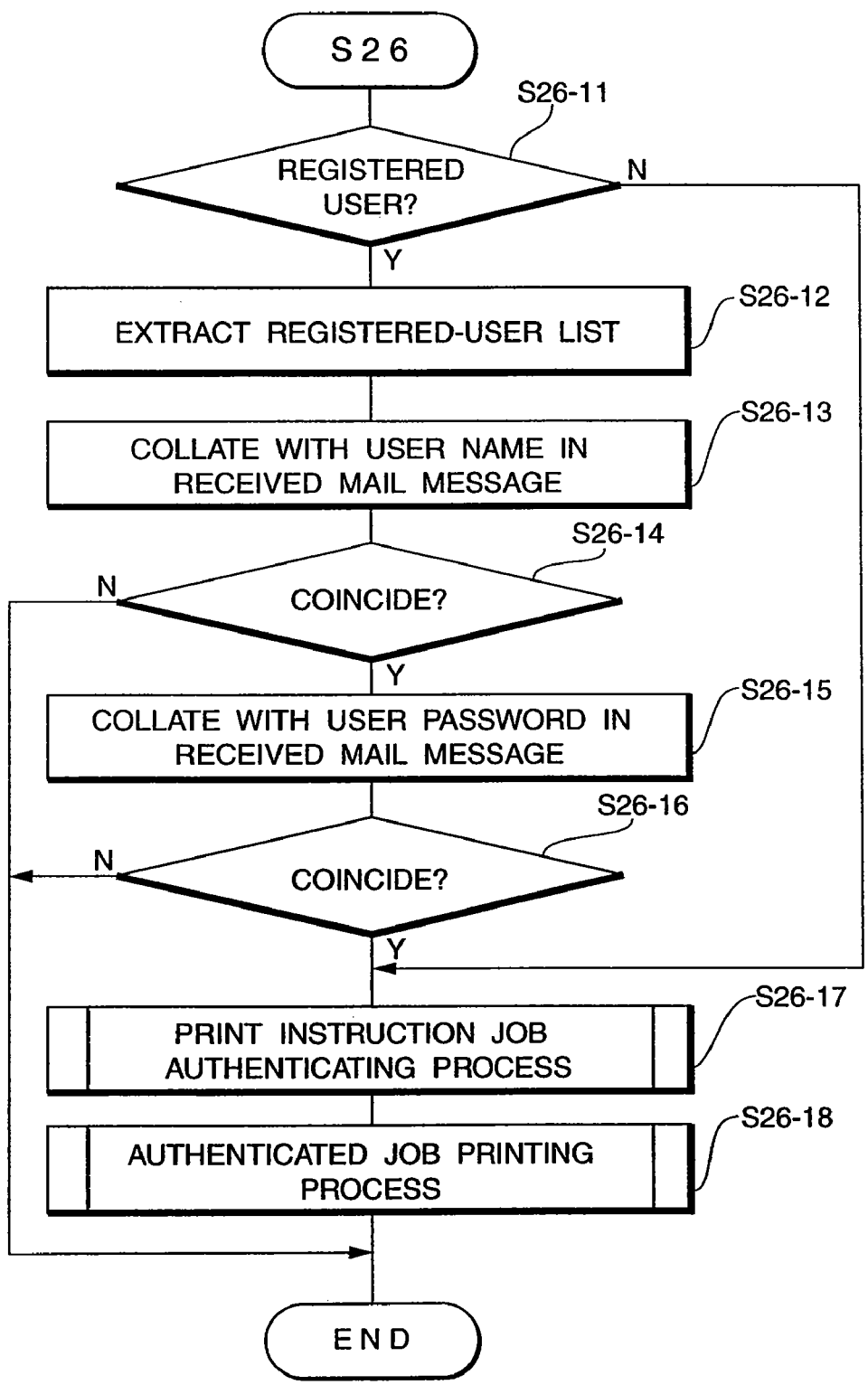
FIG. 20 is a flowchart showing the operation of the print instruction mail process in the case of confirming whether a print instruction has been transmitted by the registered user or not in the first embodiment of the invention.
Figures 21, 22:
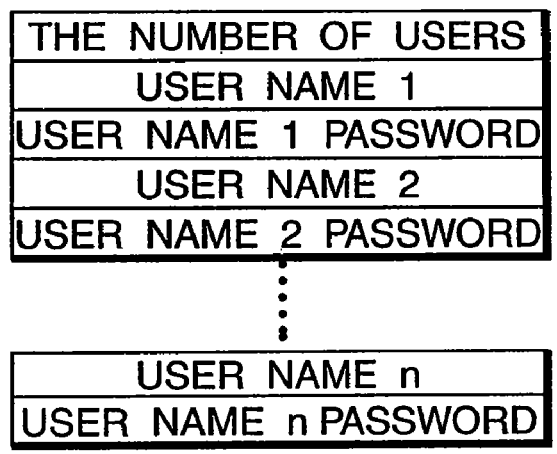
FIG. 21 is a diagram showing a message of received mail in the case of confirming whether a print instruction has been transmitted by the registered user or not in the first embodiment of the invention.
FIG. 22 is a diagram showing a list of registered users in the first embodiment of the invention.

FIG. 20 is a flowchart showing the operation of a print instruction mail process in the case of confirming whether the print instruction has been transmitted by the registered user or not in the first embodiment of the invention. FIG. 21 is a diagram showing the message of the received mail in the case of confirming whether the print instruction has been transmitted by the registered user or not in the first embodiment of the invention. FIG. 22 is a diagram showing a list of registered users in the first embodiment of the invention.

In this case, it is assumed that the registered-user list having the user names and passwords as attributes as shown in FIG. 22 has been stored in the HDD 28 in the printing apparatus before the print job is received. Although the registration of the users can be realized by, for example, inputting the user name and the password from the operation panel 27, it can be also realized by another method whereby, for example, they are transmitted as command data from the host.

If the printing apparatus receives the received mail having the message as shown in FIG. 21 in a state where the print job has already been stored in the HDD 28 in the printing apparatus, the E-mail message is analyzed by the E-mail receiving process shown in FIG. 10. If the received mail is the inquiry mail, the inquiring mail process shown in FIG. 14 is executed. If it is the print instruction mail, the print instruction mail process is executed.

Subsequently, the operation of the print instruction mail process of the printing apparatus will be described.

First, whether the registered-user list shown in FIG. 22 exists in the printing apparatus or not is discriminated. If it does not exist, a print instruction job authenticating process and an authenticated job printing process are executed and the processing routine is finished.

If the registered-user list as shown in FIG. 22 exists in the printing apparatus, a character train which starts at USER= and is surrounded by " " of the received mail message is collated with the user name in the registered-user list and whether the coincident user name exists or not is discriminated. If the coincident user name does not exist, the received mail is received and abandoned as invalid mail and the processing routine is finished.

If the coincident user name exists, a character train which starts at UPW= and is surrounded by " " of the received mail message is collated with the password corresponding to the coincident user name in the registered-user list and whether the coincident password exists or not is discriminated. If the coincident password does not exist, the processing routine is finished by regarding the received mail as invalid mail. If the coincident password exists, it is determined that the received mail is valid mail, the authenticated job printing process is executed, and the processing routine is finished. (Although the example regarding the print instruction mail has been shown in the embodiment, the present process can be also used for other mail, for example, "inquiry mail" or the like.)

Subsequently, a flowchart will be explained.

Step S26-11: Whether the registered user exists or not is discriminated on the basis of the number of users in FIG. 22. If the registered user exists, step S26-12 follows. If the registered user does not exist, step S26-17 follows.

Step S26-12: The registered-user list is extracted from the HDD 28.

Step S26-13: The character train is collated with the user name in the received mail message. (It is collated with all users registered in the list.)

Step S26-14: Whether the character train coincides with the user name in the received mail message or not is discriminated. If they coincide, step S26-15 follows. If they do not coincide, the processing routine is finished.

Step S26-15: The character train is collated with the user password in the received mail message.

Step S26-16: Whether the character train coincides with the user password in the received mail message or not is discriminated. If they coincide, step S26-17 follows. If they do not coincide, the processing routine is finished.

Step S26-17: The authenticating process of a print instructed job is executed.

Step S26-18: The authenticated job printing process is executed.

By confirming whether the print instruction has been transmitted by the registered user or not as mentioned above, an illegal print request can be prevented.

Subsequently, the operation in the case where a real image of the first page of the print job can be confirmed in the printing apparatus will be described.

Figure 23:
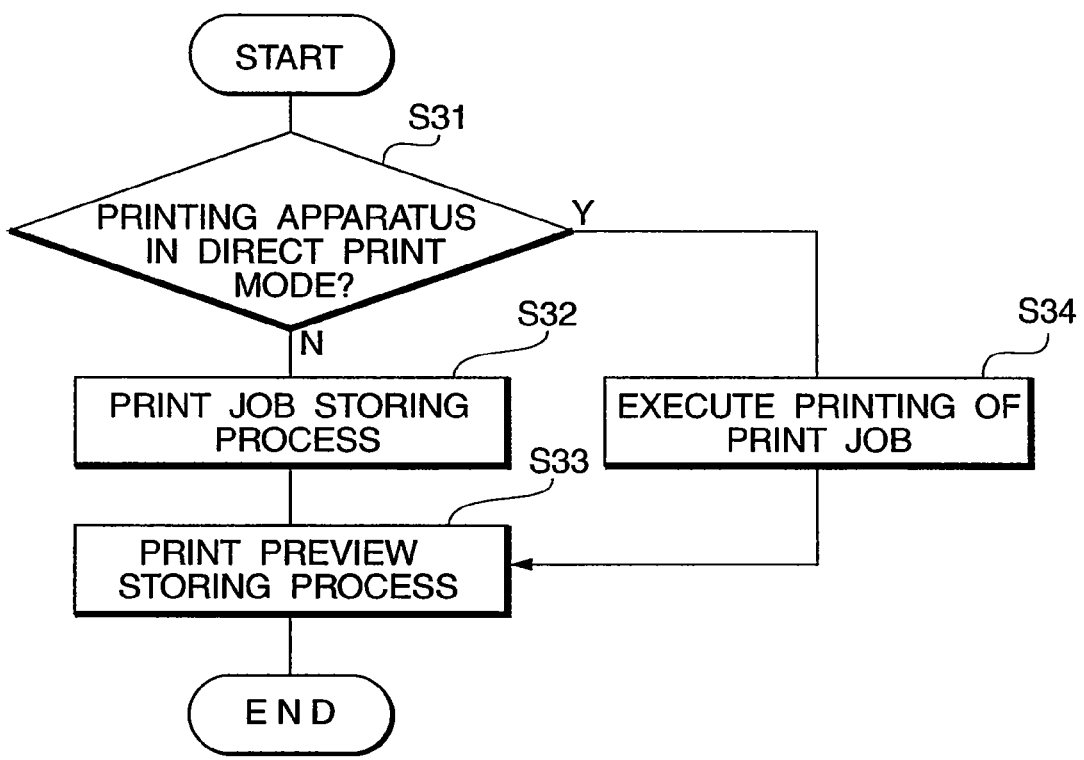
FIG. 23 is a flowchart showing the operation of a print job receiving process in the case where a real image of the first page of a print job can be confirmed in the first embodiment of the invention.

FIG. 23 is a flowchart showing the operation of a print job receiving process in the case where the real image of the first page of the print job can be confirmed in the first embodiment of the invention. FIG. 24 is a diagram showing a structure of the print-waiting job list in the case where the real image of the first page of the print job can be confirmed in the first embodiment of the invention.

In this case, whether the printing apparatus is in the direct print mode or not is discriminated. It is assumed that the discrimination reference about the direct print mode has been preset by the method whereby, for example, the user operates the operation panel 27 or the like. If the printing apparatus is in the direct print mode, the printing is executed as it is and the processing routine is finished. If it is not in the direct print mode, the print job storing process is executed. Subsequently, a print preview storing process is executed.

Figure 24C:
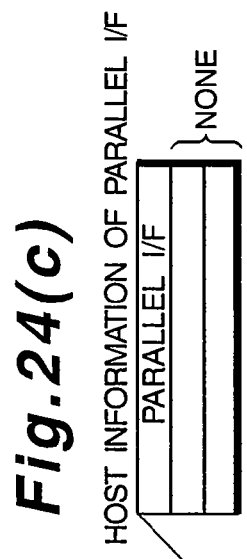
FIG. 24 is a diagram showing a structure of a list of print-waiting jobs in the case where the real image of the first page of the print job can be confirmed in the first embodiment of the invention.
Figure 24D:
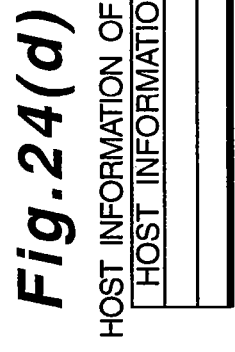
Figure 24E:
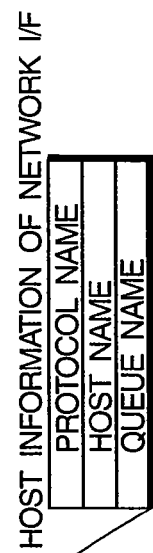

The print job storing process is executed as shown in FIG. 7. In the print preview storing process, the print data corresponding to the first page of the print job is developed into a bit map in a display possible format, for example, JPEG, PDF, or the like, formed as a print preview, and stored into the storing means such as an HDD 28 or the like. In this case, a new entry is added to the print-waiting job list in the HDD 28 in order to store the received print job. In this case, as shown in FIG. 24(a), a job n as a new entry is added to the last of the print-waiting job list and the number of jobs is increased.

Figure 24B:
Figure 24A:
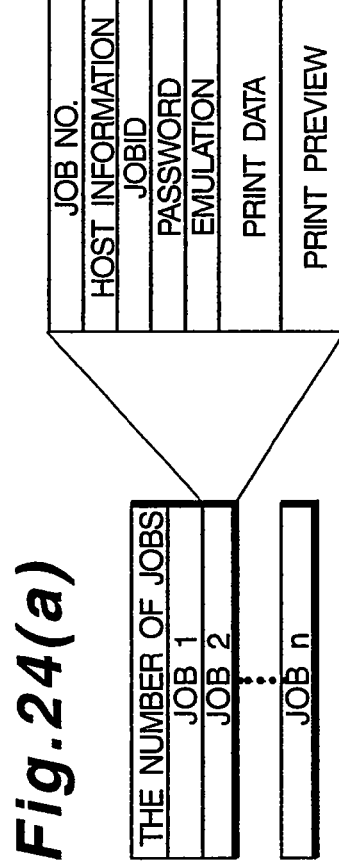

As shown in FIG. 24(b), attribute information (a job number, host information, a job ID, a password, emulation), print data, and a print preview can be stored in each job. The job number is a number which starts from 1 and is automatically increased each time a new entry is added. The host information has been predetermined in dependence on the type of host I/F. In the case of the parallel I/F or USB I/F, as shown in FIGS. 24(c) and (d), only the name of the I/F or the host information is stored. In the case of the network I/F, as shown in FIG. 24(e), a name of the protocol which received the print job, a host name, and a queue name are stored. Although the job ID and the password can be obtained from the print job, there is a case where they do not exist in dependence on the print job. Further, the emulation can be obtained by analyzing the print data.

When a new entry job is added, the host information is written into the entry job in accordance with the host OF received at this time. Subsequently, on the basis of the header information of the print job, whether the job ID and the password exist or not is discriminated. If the job ID and the password exist, they are also written into the entry job. In addition to the print data and the print preview, the job ID and the password have been added as header information to the print job. Those header information is not indispensable in the embodiment.

Subsequently, a flowchart will be explained.

Step S31: Whether the printing apparatus is in the direct print mode or not is discriminated. If it is in the direct print mode, step S34 follows. If it is not in the direct print mode, step S32 follows.

Step S32: The print job storing process is executed.

Step S33: The print preview storing process is executed and the processing routine is finished.

Step S34: The printing of the print job is executed and the processing routine is finished.

Subsequently, the print preview storing processing operation as an operation which is executed by the printing apparatus to store the print preview will be described.

Figure 25:
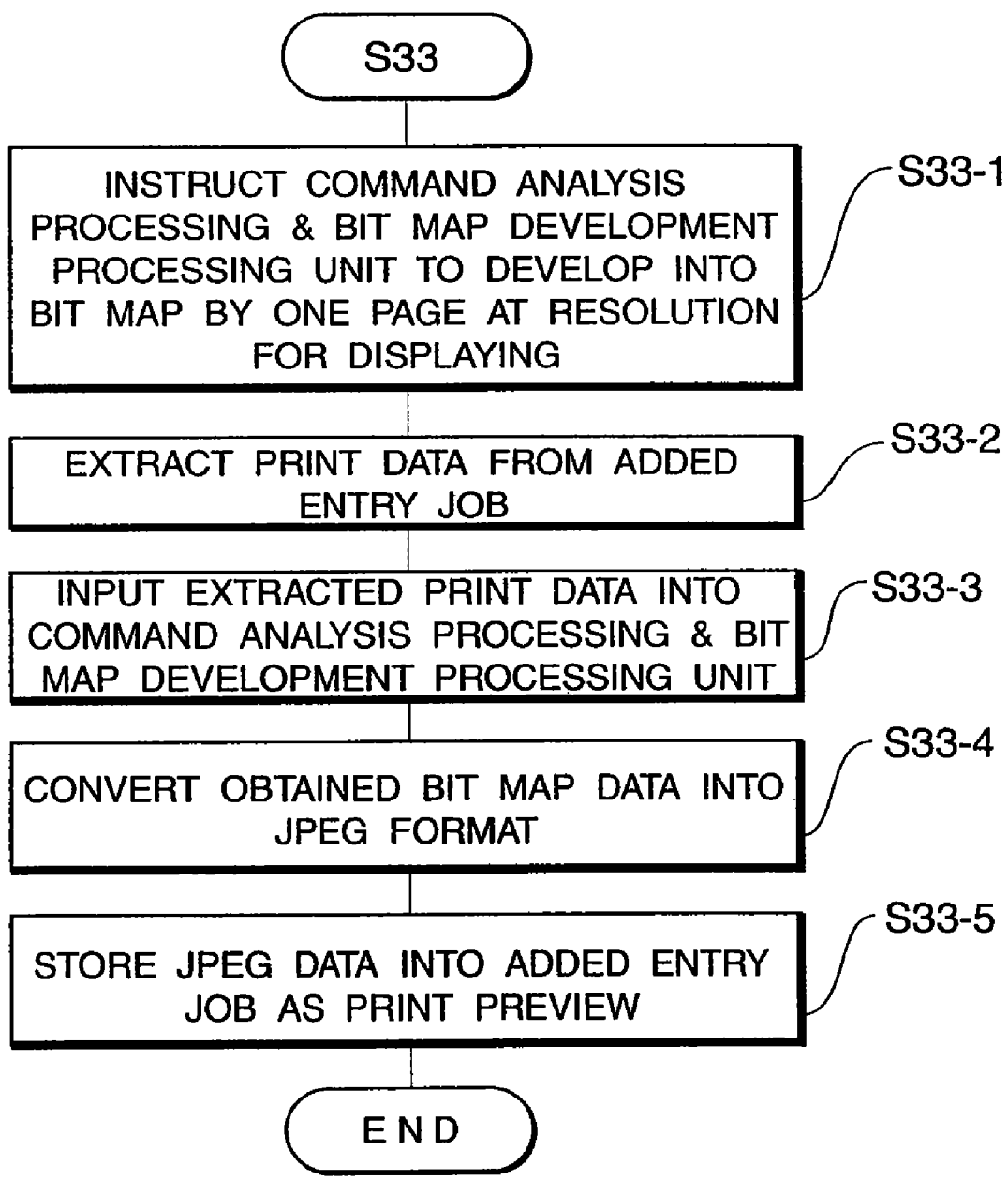
FIG. 25 is a flowchart showing the operation of a print preview storing process in the first embodiment of the invention.

FIG. 25 is a flowchart showing the operation of the print preview storing process in the first embodiment of the invention. FIG. 26 is a diagram showing a message of reply mail including the print preview and an attachment file in the first embodiment of the invention.

First, in order to develop the print data corresponding to the first page of the print job into the bit map and form a print preview, the command analysis processing and bit map development processing unit 46 is instructed to develop the print data of only one page into the bit map at resolution for displaying. The print data is extracted from the entry job added to the print-waiting job list in the HDD 28 and inputted to the command analysis processing and bit map development processing unit 46, or when the creation of the data of one page is finished, the command analysis process and the bit map development process are finished.

Subsequently, the formed bit map is converted into a JPEG (Joint Photographic Experts Group) format so as to obtain JPEG data and the JPEG data is stored as a print preview into the entry job added to the print-waiting job list in the HDD 28.

When the inquiry mail is received in this state, the inquiry mail process as shown in FIG. 14 is executed. The print-waiting job list is read out from the HDD 28 and the print-waiting job list as shown in FIG. 24(a) is converted into a reply mail format as shown in FIG. 26. A specific converting procedure is executed on the basis of the correspondence as shown in FIG. 13. After each item in the print-waiting job list is converted into a character train showing the type of item and a character train showing its contents, the JPEG data is attached as an attachment file. Subsequently, the formed reply mail message and the attachment file are returned to the sender address of the stored received mail shown in FIG. 11.

Subsequently, a flowchart will be explained.

Step S33-1: The command analysis processing and bit map development processing unit 46 is instructed to develop the print data of only one page into the bit map at the resolution for displaying.

Step S33-2: The print data is extracted from the added entry job in the HDD 28.

Step S33-3: The extracted print data is inputted to the command analysis processing and bit map development processing unit 46.

Step S33-4: The obtained bit map data is converted into the JPEG format.

Step S33-5: The JPEG data is stored as a print preview into the added entry job in the HDD 28 and the processing routine is finished.

By the above processes, the E-mail in which the JPEG data of the print preview obtained by developing the print data corresponding to the first page of the print job into the bit map has been attached as an attachment file is returned as reply mail to the sender address. Therefore, the user who operates the host which received the reply mail can confirm the print data of the first page of the print job by opening the attachment file and seeing it, so that he can more accurately discriminate the type of the print job.

By converting the print data into the JPEG data of the resolution for displaying, the size of reply mail can be reduced to a small size.

That is, by adding an image of the print job to the information to be notified, the contents of the print job can be visually confirmed and the print instructor or the receiver can distinguish the necessary print job from a plurality of print jobs. If images of all pages are added, a data capacity of the information to be notified increases. Therefore, for example, by adding the image of the first one page (or a few pages), the data capacity can be reduced. By setting the resolution of the image to be lower than that of the printing apparatus and, for example, compressing by the JPEG format, the data capacity of the information to be notified can be reduced. Further, since the JPEG format is a format which is widely used, a problem such that the image cannot be opened does not occur.

Not only when the print job is received but also when there is a request from the print instructor, an information processing apparatus which is operated by the print instructor or the receiver can be notified of the information stored in the printing apparatus and the list of the print jobs having the images. Thus, the print instructor or the receiver can select the print job to be executed from the list and transmit an executing instruction to the printing apparatus. Use convenience can be further improved.

Subsequently, the second embodiment of the invention will be described. Since a structure of a printing apparatus in the second embodiment is similar to that of the printing apparatus in the first embodiment, it will be explained also with reference to FIGS. 1 to 3. Component elements having the same structure as those in the first embodiment are designated by the same reference numerals and their description is omitted here.

Figure 27:
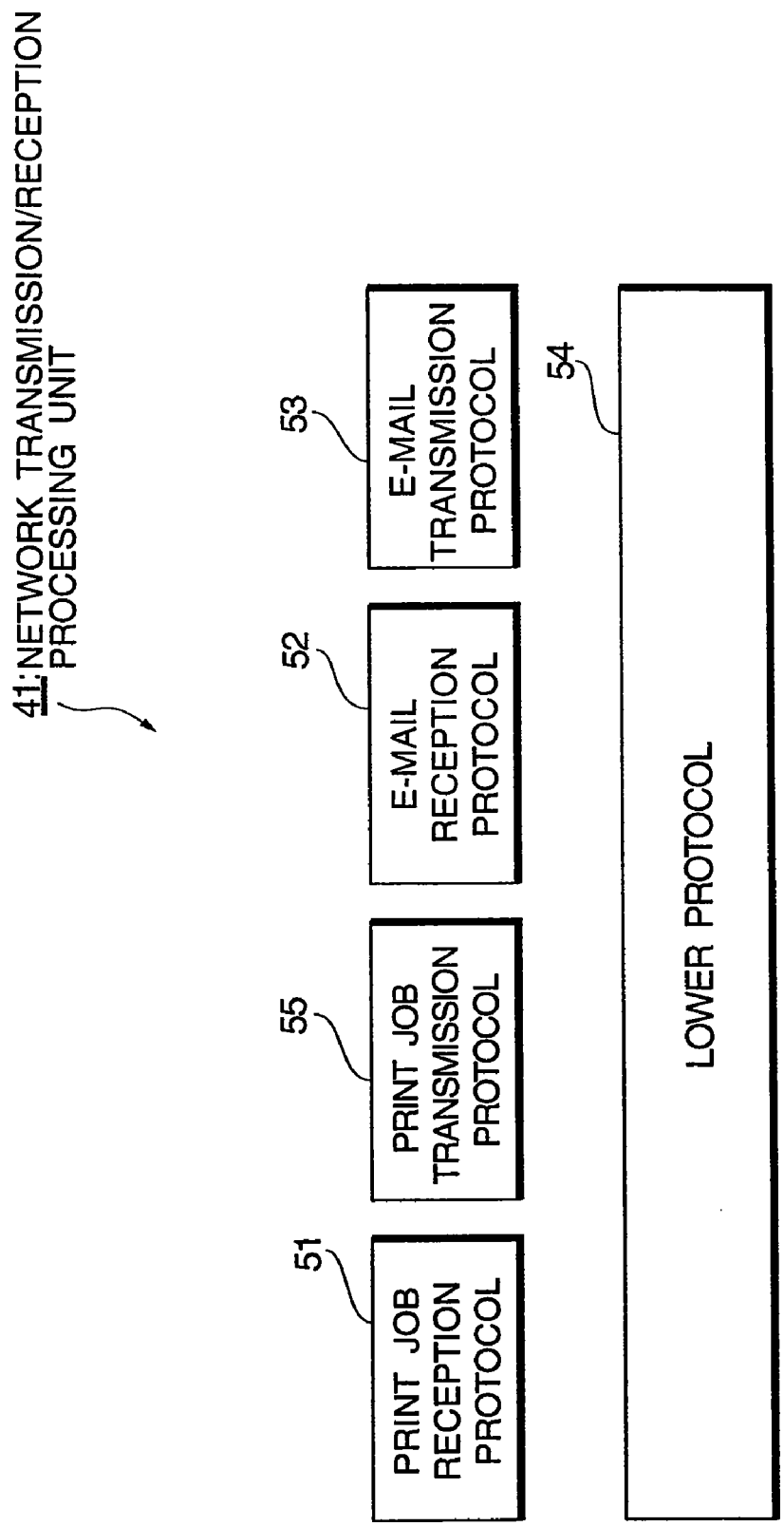
FIG. 27 is a block diagram showing a construction of a network transmission/reception processing unit in the second embodiment of the invention.

FIG. 27 is a block diagram showing a construction of a network transmission/reception processing unit in the second embodiment of the invention.

In this case, a print job transmission protocol (specifically, 1 pr or the like) 55 to transmit the print job to the network transmission/reception processing unit 41 in the first embodiment is added.

Subsequently, the operation of the printing apparatus with the above construction will be described. With respect to the operation of the printing apparatus in the embodiment, only portions different from those of the operation of the printing apparatus in the first embodiment will be explained.

Figure 28:
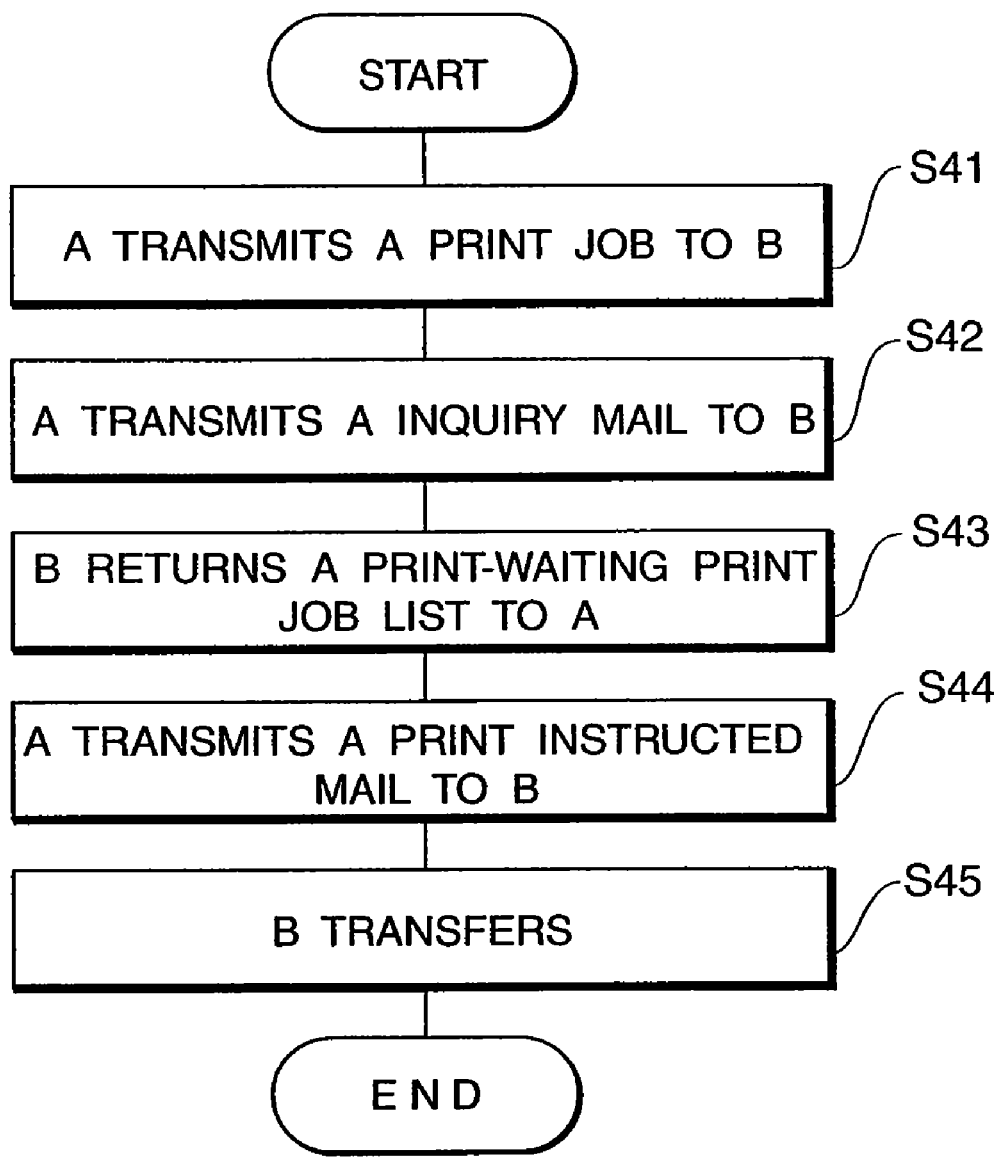
FIG. 28 is a flowchart showing the operation of a printing apparatus in the second embodiment of the invention.

FIG. 28 is a flowchart showing the operation of the printing apparatus in the second embodiment of the invention.

First, the user operates one of the first to third hosts 11 to 13, for example, the first host 11 and transmits the print job to one of the first to third printing apparatuses 14 to 16, for example, the first printing apparatus 14. The print job can be directly transmitted to the first printing apparatus 14 by the transmission protocol or after the print job is once stored into the queue 18 of the first server 17, it can be also transmitted from the first server 17 to the first printing apparatus 14.

Subsequently, the user transmits E-mail serving as an inquiry, that is, inquiry mail from the first host 11 to the first printing apparatus 14. The first printing apparatus 14 which received the inquiry mail returns the print-waiting job list stored in the HDD 28 as E-mail to the first host 11 serving as an inquiring source.

Subsequently, on the basis of the contents of the E-mail returned to the first host 11, the user selects the print job for executing the printing from the print-waiting job list and transmits the transfer instruction mail to instruct the transfer of the printing of the print job to another printing apparatus, for example, the second printing apparatus 15 to the first printing apparatus 14. The first printing apparatus 14 which received the transfer instruction mail transfers the designated print job to the designated second printing apparatus 15.

Subsequently, a flowchart will be described.
Step S41: The print job is transmitted.
Step S42: The inquiry mail is transmitted.
Step S43: The print-waiting print job list is returned.
Step S44: The transfer instruction mail is transmitted.
Step S45: The print job is transferred and the processing routine is finished.

Subsequently, the operation of the E-mail receiving process will be described.

Figure 29:
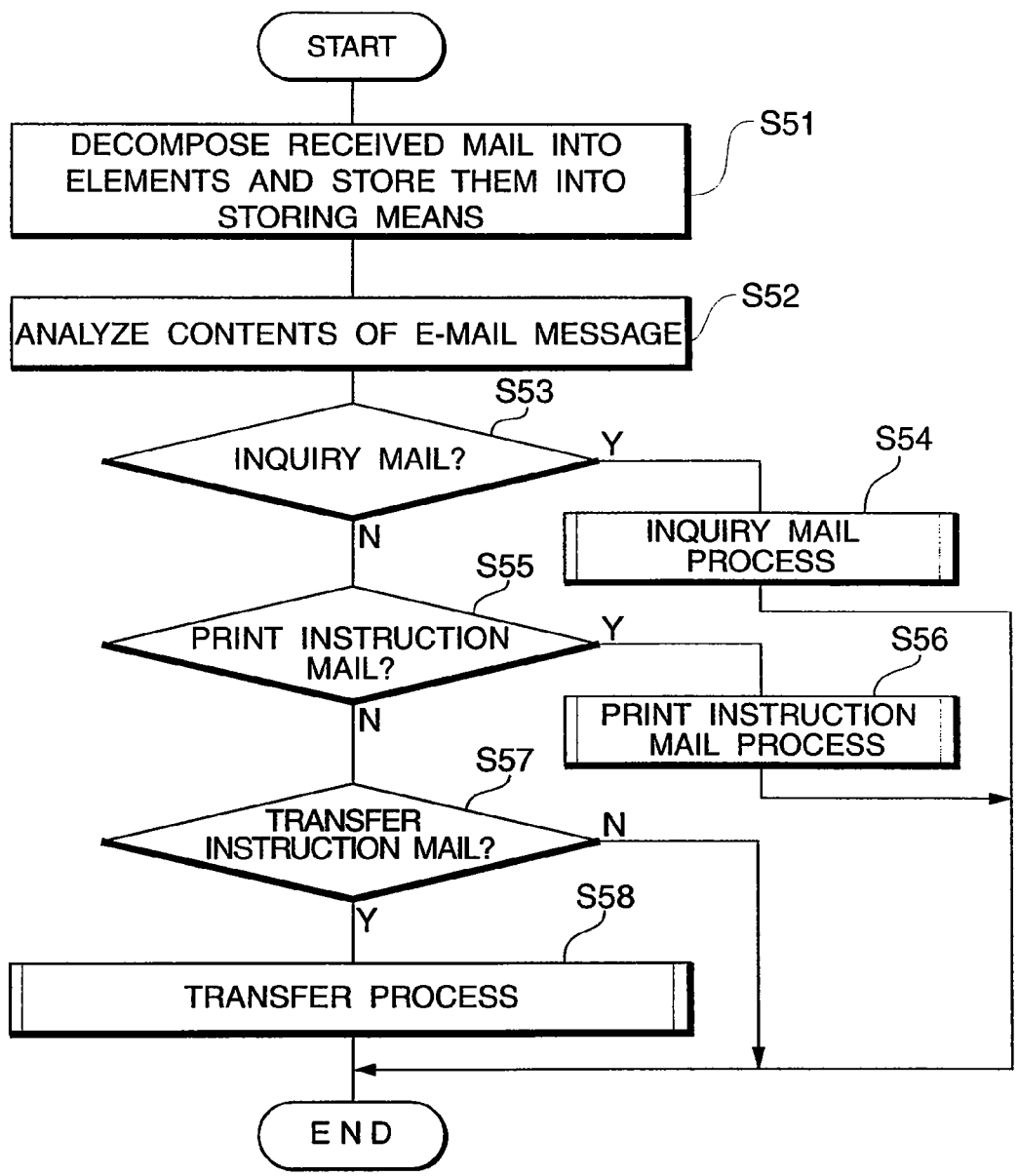
FIG. 29 is a flowchart showing the operation of an E-mail receiving process in the second embodiment of the invention.

FIG. 29 is a flowchart showing the operation of the E-mail receiving process in the second embodiment of the invention. FIG. 30 is a diagram showing a message of received mail in the second embodiment of the invention.

In this case, when the E-mail having the message of the transfer instruction mail in the received mail shown in FIG. 30 is received in a state where the print job to be transferred has been stored in the HDD 28, the E-mail receiving process is executed. By the analysis of the E-mail message, if it is determined that the received mail is the transfer instruction mail, the transfer process is executed.

Subsequently, a flowchart will be described.
Step S51: The received mail is decomposed into elements and stored into the storing means.
Step S52: The contents of the E-mail message are analyzed.
Step S53: Whether the received mail is the inquiry mail or not is discriminated. If it is the inquiry mail, step S54 follows. If it is not the inquiry mail, step S55 follows.
Step S54: The inquiry mail process is executed and the processing routine is finished.
Step S55: Whether the received mail is the print instruction mail or not is discriminated. If it is the print instruction mail, step S56 follows. If it is not the print instruction mail, step S57 follows.
Step S56: The print instruction mail process is executed and the processing routine is finished.
Step S57: Whether the received mail is a transfer instruction mail or not is discriminated. The transfer instruction mail is recognized by confirming that the mail message starts from "TO=". If it is the transfer instruction mail, step S58 follows. If it is not the transfer instruction mail, the processing routine is finished.
Step S58: The transfer process is executed and the processing routine is finished.

Subsequently, the transfer processing operation as an operation which is executed at the time when the printing apparatus transfers the received mail will be explained.

Figure 31:
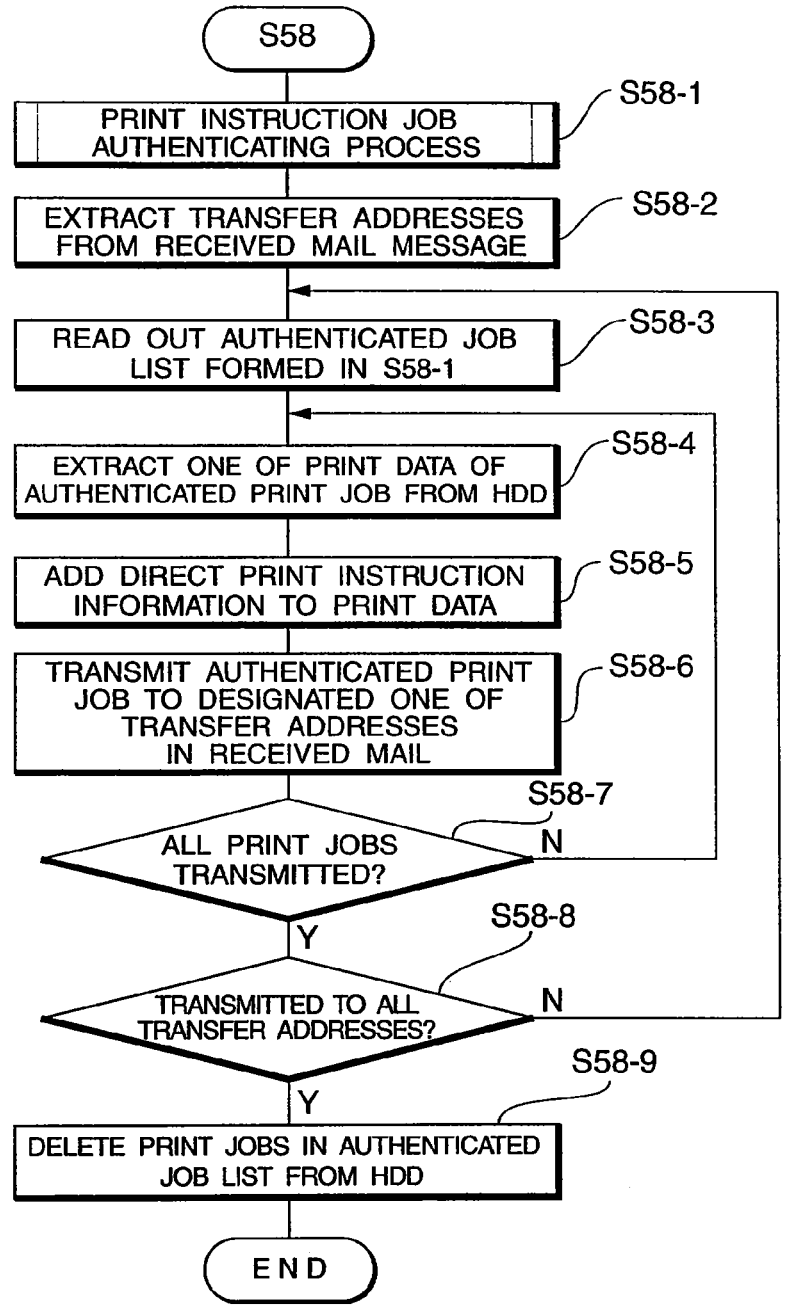
FIG. 31 is a flowchart showing the operation of a transfer process in the second embodiment of the invention.
Figure 32:
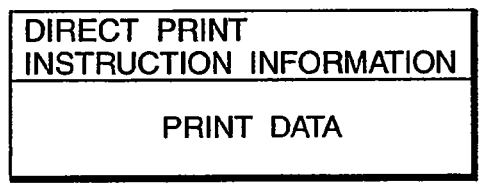
FIG. 32 is a diagram showing a structure of a direct print job in the second embodiment of the invention.

FIG. 31 is a flowchart showing the operation of the transfer process in the second embodiment of the invention. FIG. 32 is a diagram showing a structure of a direct print job in the second embodiment of the invention.

First, the print instruction job authenticating process as shown in FIG. 17 in the first embodiment is executed. The print job to be transferred is formed as an authenticated job list as shown in FIG. 18 in the first embodiment. Subsequently, a character train which starts at TO= and is surrounded by " " of the received mail message is extracted and stored as an address to be transferred.

Subsequently, one print job is extracted from the authenticated job list. The print data corresponding to it is extracted from the print-waiting job list stored in the HDD 28. As shown in FIG. 32, direct print instruction information is added to the head of the print data and the resultant data is transmitted to a transfer address serving as information to designate another printing apparatus by using the print job transmission protocol 55. All print data in the authenticated job list is transmitted by a similar method.

If a plurality of character trains each of which starts at TO= and is surrounded by " " exist in the received mail message, they are interpreted as different transfer addresses and the print data corresponding to the authenticated job list is transmitted by the method as mentioned above.

Finally, all of the print jobs in the print-waiting job list corresponding to the authenticated job list are deleted from the HDD 28. The printing apparatus which received the transferred print job activates the print job receiving process. (Although the transfer process is executed after the creation of the authenticated job list in the embodiment, a process for directly transferring it from the print-waiting job list can be also executed without forming the authenticated job list, or it is also possible to construct the apparatus in a manner such that whether the deletion of the data from the print-waiting job list after completion of the transfer is performed or not can be selected.)

Subsequently, a flowchart will be described.

Step S58-1: A print instruction job authenticating process is executed.

Step S58-2: The transfer addresses are extracted from the received mail message.

Step S58-3: The authenticated job list formed in step S58-1 is read out.

Step S58-4: One print data of the authenticated print job is extracted from the HDD 28.

Step S58-5: The direct print instruction information is added to the print data.

Step S58-6: The authenticated print job is transmitted to one of the designated transfer addresses in the received mail.

Step S58-7: Whether all of the print jobs have been transmitted or not is discriminated. If all of the print jobs have been transmitted, step S58-8 follows. If all of the print jobs are not transmitted, the processing routine is returned to step S58-4.

Step S58-8: Whether the print jobs have been transmitted to all of the transfer addresses or not is discriminated. If they were transmitted to all of the transfer addresses, step S58-9 follows. If the print job is not transmitted to all of the transfer addresses, the processing routine is returned to step S58-3.

Step S58-9: The print jobs in the authenticated job list are deleted from the HDD 28 and the processing routine is finished.

Subsequently, the operation of the print job reception processing unit 44 will be described.

Figure 33:
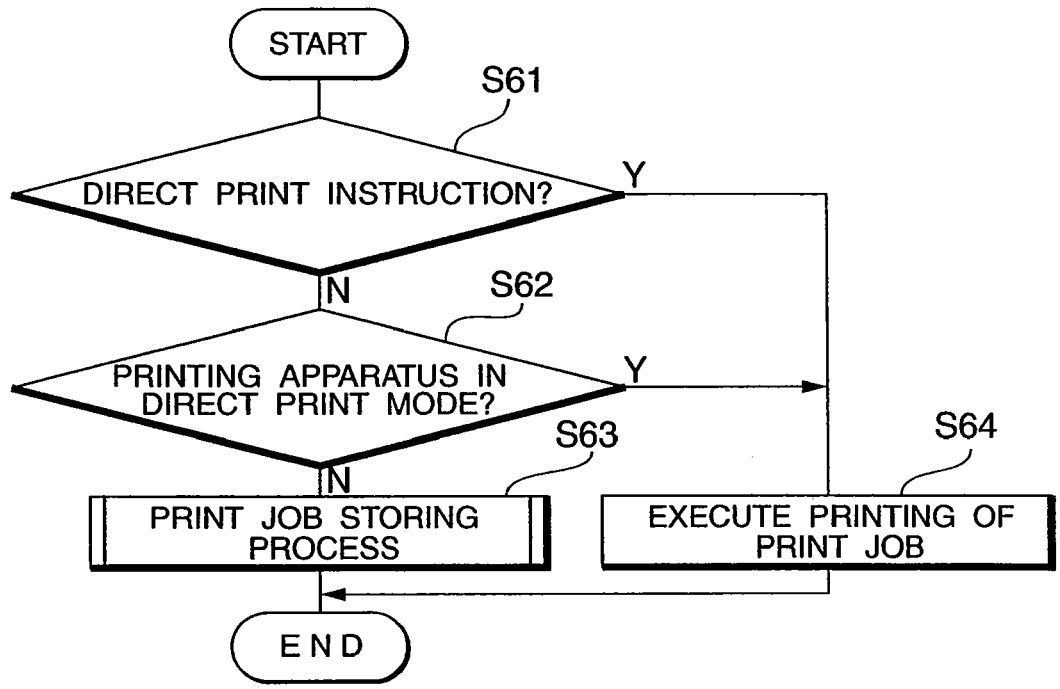
FIG. 33 is a flowchart showing the operation of a print job reception processing unit in the second embodiment of the invention.

FIG. 33 is a flowchart showing the operation of a print job reception processing unit in the second embodiment of the invention.

First, the print job reception processing unit 44 discriminates whether the direct print instruction information exists at the head of the print job shown in FIG. 32 or not. If the direct print instruction information exists, the printing is executed. (For example, when the direct print instruction is made, "1" is stored into this area. When the storage instruction is made, "0" is stored.)

If the direct print instruction information does not exist, in a manner similar to the case of the first embodiment, whether the printing apparatus has been set into the direct print mode or not is discriminated. If the printing apparatus has been set to the direct print mode, the printing is executed. If the printing apparatus is not set to the direct print mode, the print job is added to the print-waiting job list in the HDD 28.

Subsequently, the flowchart will be described.

Step S61: The presence or absence of the direct print instruction is discriminated. If the direct print instruction exists, step S64 follows. If the direct print instruction does not exist, step S62 follows.

Step S62: Whether the printing apparatus is in the direct print mode or not is discriminated. If it is in the direct print mode, step S64 follows. If it is not in the direct print mode, step S63 follows.

Step S63: The print job storing process is executed and the processing routine is finished.

Step S64: The printing of the print job is executed and the processing routine is finished.

Thus, in the case where the printing apparatus in which the print jobs have been stored cannot execute the printing, an improper case, or the like, the printing can be performed by using another printing apparatus or by a plurality of printing apparatuses.

Subsequently, the third embodiment of the invention will be described. Since a structure of the printing apparatus in the third embodiment is similar to that of the printing apparatus in the first embodiment, it will be explained also with reference to FIGS. 1 to 4. With respect to the operation of the printing apparatus in the third embodiment, only portions different from those of the operations of the printing apparatuses in the first and second embodiments will be explained.

Figure 34:
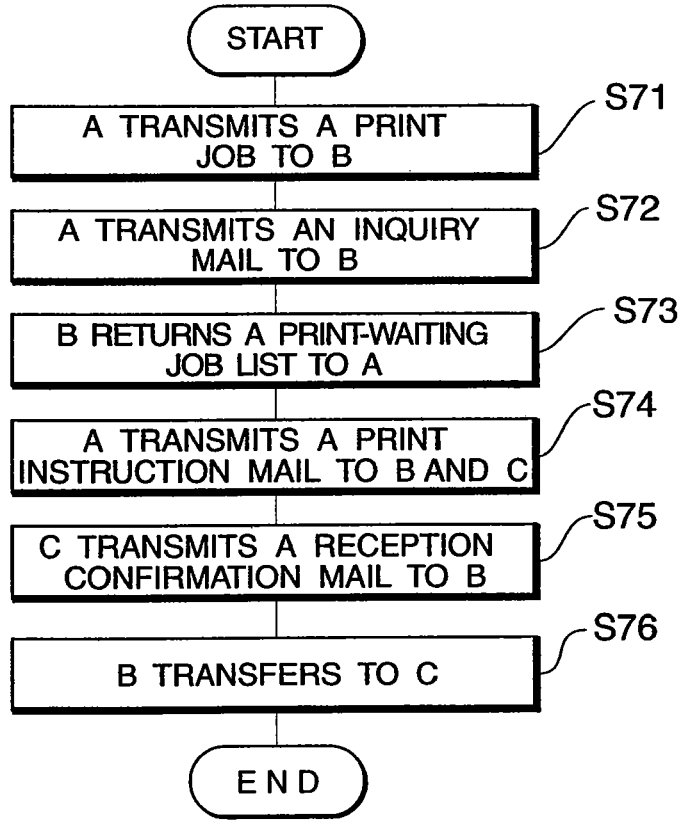
FIG. 34 is a flowchart showing the operation of a printing apparatus in the third embodiment of the invention.

FIG. 34 is a flowchart showing the operation of the printing apparatus in the third embodiment of the invention.

First, the user operates one of the first to third hosts 11 to 13, for example, the first host 11 and transmits the print job to one of the first to third printing apparatuses 14 to 16, for example, the first printing apparatus 14. The print job can be directly transmitted to the first printing apparatus 14 by the transmission protocol or after the print job is once stored into the queue 18 of the first server 17, it can be also transmitted from the first server 17 to the first printing apparatus 14.

Subsequently, the user transmits the inquiry E-mail, that is, the inquiry mail from the first host 11 to the first printing apparatus 14. The first printing apparatus 14 which received the inquiry mail returns the print-waiting job list stored in the HDD 28 as E-mail to the first host 11 serving as an inquiring source.

Subsequently, on the basis of the contents of the E-mail returned to the first host 11, the user selects the print job to be printed from the print-waiting job list and transmits the print instruction mail obtained by adding an address of a transfer destination to a CC address to the first printing apparatus 14. In this case, the print instruction mail is also transmitted to the printing apparatuses corresponding to the address of the transfer destination added to the CC address, for example, the second and third printing apparatuses 15 and 16.

Subsequently, the first printing apparatus 14 enters a standby mode in order to receive reception confirmation mail from the second and third printing apparatuses 15 and 16. The second and third printing apparatuses 15 and 16 transmit the reception confirmation mail to confirm that the transferred print instruction mail has been received to the first printing apparatus 14 as a printing apparatus corresponding to the TO address of the print instruction mail. The first printing apparatus 14 which received the reception confirmation mail from the second and third printing apparatuses 15 and 16 transfers the designated print job to the printing apparatus having the designated CC address.

Subsequently, a flowchart will be described.

Step S71: The print job is transmitted.

Step S72: The inquiry mail is transmitted.

Step S73: The print-waiting job list is returned.

Step S74: The print instruction mail is transmitted.

Step S75: The reception confirmation mail is transmitted.

Step S76: The print job is transferred and the processing routine is finished.

Subsequently, the operation of the E-mail receiving process will be described.

Figure 35:
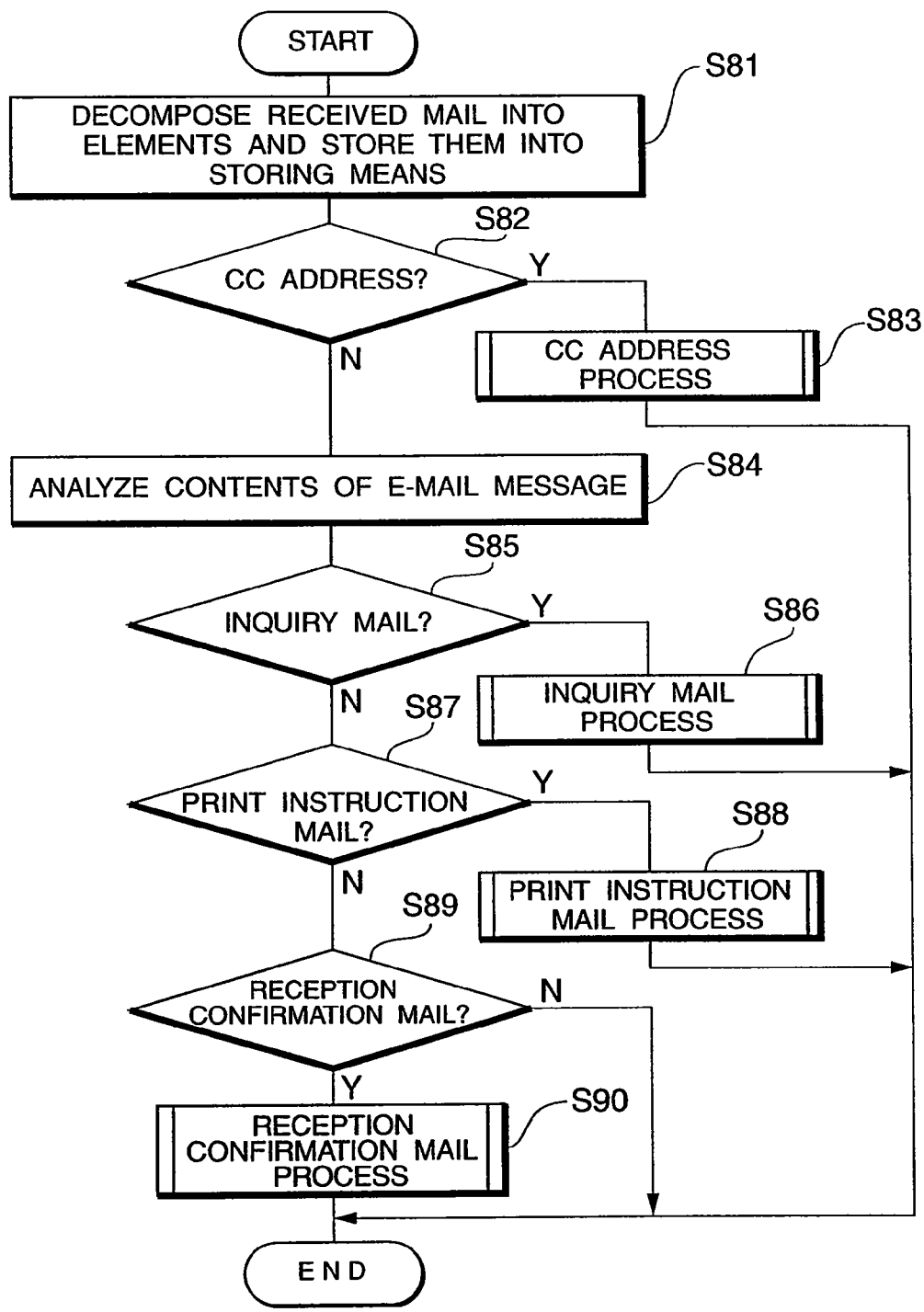
FIG. 35 is a flowchart showing the operation of an E-mail receiving process in the third embodiment of the invention.
Figures 36, 37:
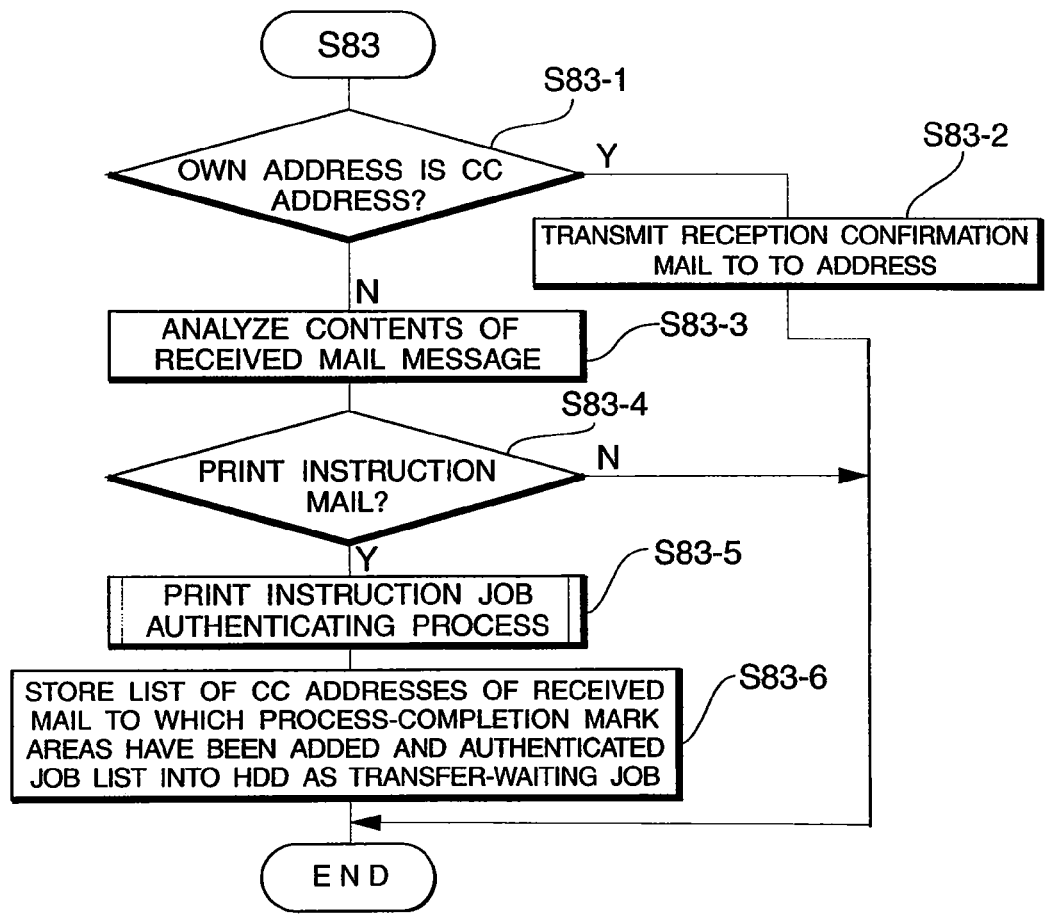
FIG. 36 is a diagram showing received mail with a CC address in the third embodiment of the invention.
FIG. 37 is a flowchart showing the operation of a CC address process in the third embodiment of the invention.

FIG. 35 is a flowchart showing the operation of the E-mail receiving process in the third embodiment of the invention. FIG. 36 is a diagram showing received mail with the CC address in the third embodiment of the invention.

In this case, if the print instruction mail added with the CC address and shown in FIG. 36 is received in a state where the print job to be transferred has been stored in the HDD 28, the E-mail receiving process is executed. In this case, since the CC address serving as information to designate another printing apparatus exists, a CC address process is also executed.

Subsequently, the flowchart will be described.

Step S81: The received mail is decomposed into elements and stored into the storing means.

Step S82: The presence or absence of the CC address is discriminated by checking the address instead of the mail message. If the CC address exists, step S83 follows. If the CC address does not exist, step S84 follows.

Step S83: The CC address process is executed and the processing routine is finished.

Step S84: The contents of the E-mail message are analyzed.

Step S85: Whether the received mail is the inquiry mail or not is discriminated. If it is the inquiry mail, step S86 follows. If it is not the inquiry mail, step S87 follows.

Step S86: The inquiry mail process is executed and the processing routine is finished.

Step S87: Whether the received mail is the print instruction mail or not is discriminated. If it is the print instruction mail, step S88 follows. If it is not the print instruction mail, step S89 follows.

Step S88: The print instruction mail process is executed and the processing routine is finished.

Step S89: Whether the received mail is the reception confirmation mail or not is discriminated. The reception confirmation mail is discriminated by confirming that the mail message starts from "JOB ACCEPTED". If it is the reception confirmation mail, step S90 follows. If it is not the reception confirmation mail, the processing routine is finished.

Step S90: The reception confirmation mail process is executed and the processing routine is finished.

Subsequently, the operation of the CC address process will be described.

Figures 38, 39:
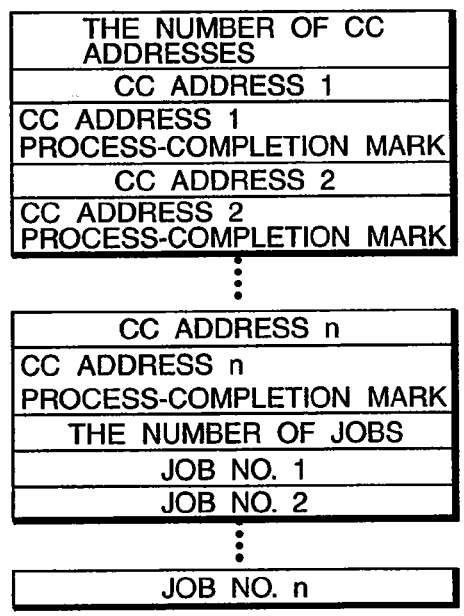
FIG. 38 is a diagram showing a message of received mail in the third embodiment of the invention.
FIG. 39 is a diagram showing transfer-waiting jobs in the third embodiment of the invention.

FIG. 37 is a flowchart showing the operation of the CC address process in the third embodiment of the invention. FIG. 38 is a diagram showing a message of the received mail in the third embodiment of the invention. FIG. 39 is a diagram showing transfer-waiting jobs in the third embodiment of the invention.

First, since the CC address is not its own address serving as information which designates the own apparatus, the printing apparatus analyzes the message of the received mail and discriminates whether the received mail is print instruction mail as shown in FIG. 38 or not. If it is not print instruction mail, nothing is executed but the processing routine is finished. If it is the print instruction mail, a print instruction job authenticating process as shown in FIG. 17 in the first embodiment is executed. An authenticated job list as shown in FIG. 18 in the first embodiment is formed.

Subsequently, as shown in FIG. 11 in the first embodiment, only the CC addresses are extracted from the stored received mail, a mark area showing whether the process has been finished (hereinafter, referred to as process-completion mark area) or not is added to each CC address, a transfer-waiting job as shown in FIG. 39 is formed by the list of the CC addresses added with the mark areas together with the authenticated job list formed before and stored into the HDD 28, and thereafter, the CC address process is finished. (In a manner similar to the above, the job on the authenticated job list can be also printed by the apparatus sent by TO.)

When reception confirmation mail as shown in FIG. 38 is received, the E-mail receiving process shown in FIG. 35 is again activated and a reception confirmation mail process is executed.

Subsequently, a flowchart will be described.

Step S83-1: Whether the own address is the CC address or not is discriminated. If it is the CC address, step S83-2 follows. If it is not the CC address, step S83-3 follows.

Step S83-2: The reception confirmation mail is transmitted to the TO address.

Step S83-3: The contents of the received mail message are analyzed.

Step S83-4: Whether the received mail is the print instruction mail or not is discriminated. If it is the print instruction mail, step S83-5 follows. If it is not the print instruction mail, the processing routine is finished.

Step S83-5: The print instruction job authenticating process is executed.

Step S83-6: The list of the CC addresses of the received mail to which the process-completion mark areas have been added and the authenticated job list are stored as a transfer-waiting job into the HDD 28 and the processing routine is finished.

Subsequently, the operation of the reception confirmation mail process in the printing apparatus will be described.

Figure 40:
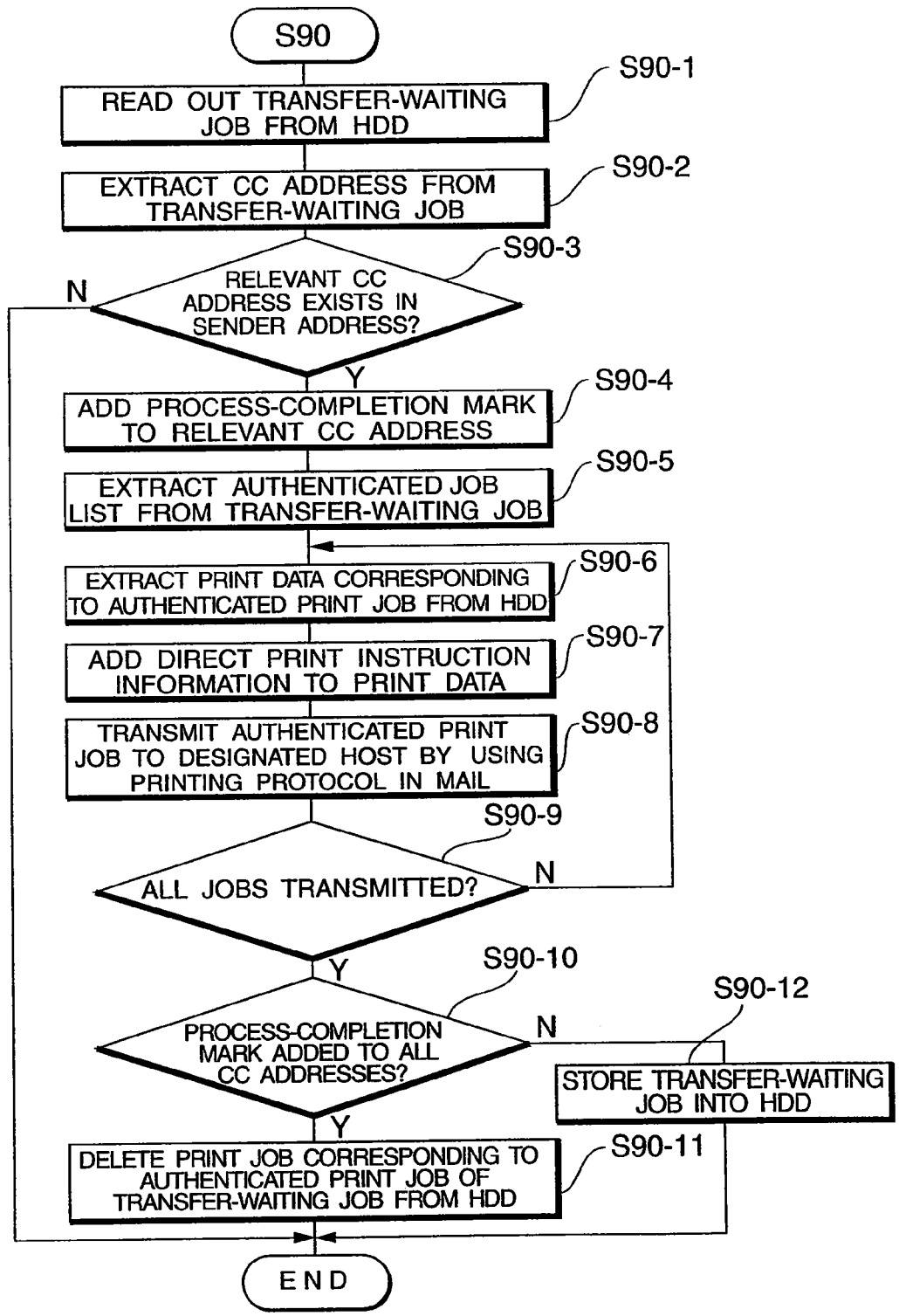
FIG. 40 is a flowchart showing the operation of a reception confirmation mail process in the third embodiment of the invention.

FIG. 40 is a flowchart showing the operation of the reception confirmation mail process in the third embodiment of the invention.

First, the printing apparatus reads out the transfer-waiting job from the HDD 28 and discriminates whether the sender address of the reception confirmation mail is included in the transfer-waiting job or not. If the sender address is not included, nothing is executed but the processing routine is finished. If the sender address is included, the process-completion mark is added to the process-completion mark area of the corresponding CC address of the transfer-waiting job.

Subsequently, the print data corresponding to the authenticated print job of the transfer-waiting job is extracted from the print-waiting job list in the HDD 28 and information indicative of the direct printing is added to the head of the print job as shown in FIG. 32 in the second embodiment. The resultant print data is transmitted to the host shown by a character train which starts at HN= and is surrounded by " " or the print apparatus by using a print protocol shown by a character train which starts at PROTOCOL= and is surrounded by " " of the message of the reception confirmation mail. Such processes are executed to all print data corresponding to the authenticated print jobs of the transfer-waiting job and the resultant print data is transmitted.

Subsequently, the process-completion mark area of each CC address of the transfer-waiting job is checked. If the process-completion mark is not added to all of the process-completion mark areas, the transfer-waiting job is again stored into the HDD 28. If the process-completion marks have been added to all of the process-completion mark areas of the CC addresses, the print job corresponding to the authenticated print job of the transfer-waiting job is deleted from the print-waiting job list in the HDD 28. (A result of the printing and the transfer (for example, normal end, transfer error, print error, or the like) can be also returned to the host on the instructing source side.)

Since the own address as information to designate the own apparatus is the CC address in the CC address process shown in FIG. 37, the printing apparatus which received the print instruction mail as shown in FIG. 36 as a CC address transmits the message of the reception confirmation mail shown in FIG. 38 to the TO address. A name of a protocol which can accept the print job is written into a portion surrounded by " " of PROTOCOL=" " and a name of the own host which is used by such a protocol is written into a portion surrounded by " " of HN=" ".

When the transferred print job is received, as shown in FIG. 32, whether the direct print instruction information exists at the head of the print job or not is discriminated. If the direct print instruction information exists, the printing is executed. If the direct print instruction information does not exist, in a manner similar to the first embodiment mentioned above, when the printing apparatus is set to the direct print mode, the printing is executed and if the printing apparatus is not set to the direct print mode, the print job is added to the print-waiting job list in the HDD 28.

Subsequently, a flowchart will be described.

Step S90-1: The transfer-waiting job is read out from the HDD 28.

Step S90-2: The CC address is extracted from the transfer-waiting job.

Step S90-3: Whether the relevant CC address exists in the sender address or not is discriminated. If the relevant CC address exists, step S90-4 follows. If the relevant CC address does not exist, the processing routine is finished.

Step S90-4: The process-completion mark is added to the relevant CC address of the transfer-waiting job.

Step S90-5: The authenticated job list is extracted from the transfer-waiting job.

Step S90-6: The print data of the authenticated print job is extracted from the HDD 28.

Step S90-7: The direct print instruction information is added to the print data.

Step S90-8: The authenticated print job is transmitted to the designated host by using the protocol for printing in the mail.

Step S90-9: Whether all of the jobs have been transmitted or not is discriminated. If all of the jobs have been transmitted, step S90-10 follows. If all of the jobs are not transmitted, the processing routine is returned to step S90-6.

Step S90-10: Whether the process-completion marks have been added to all of the CC addresses in the transfer-waiting job or not is discriminated. If the process-completion marks have been added to all of the CC addresses, step S90-11 follows. If the process-completion mark is not added to all of the CC addresses, step S90-12 follows.

Step S90-11: The print job corresponding to the authenticated print job of the transfer-waiting job is deleted from the HDD 28.

Step S90-12: The transfer-waiting job is stored into the HDD 28.

As mentioned above, since the print job is transferred after waiting for the reception confirmation from the printing apparatus which intends to transfer the print job, a situation such that the print job is transferred to the erroneous address or the print job is transferred to the printing apparatus in a state where it cannot receive the print job because of power-OFF or the like is eliminated, and the print job can be certainly printed on the transfer destination side.

As many apparently widely different embodiments of the present invention can be made without departing from the spirit and scope thereof, it is to be understood that the invention is not limited to the specific embodiments thereof except as defined in the appended claims.

As described in detail above, according to the invention, the printing apparatus comprises: the storing means which stores the print data; the printing means which prints the print data onto the medium; the reply means which returns the list regarding the print data stored in the storing means to the host in response to the inquiry received from the host; and the print instructing means which allows the printing means to print the print data stored in the storing means in response to the print instruction from the host.

In this case, the necessary print job can be easily selected from a plurality of print jobs and only the print data of the selected print job can be printed.

I claim:

1. A system comprising:
a host configured to send a transfer information command via an electronic message to a transfer source apparatus for instructing the transfer source apparatus to transfer data to at least one transfer destination apparatus, and to further simultaneously send the transfer information command via the electronic message to the at least one transfer destination apparatus, the electronic message containing the transfer information command including transfer source information in a TO address of the electronic message and transfer destination information in a CC address of the electronic message;
a first transfer apparatus; and
a second transfer apparatus, each of the first and second transfer apparatus being configured to serve as either the transfer source apparatus or the transfer destination apparatus and each having an analyzing section to determine whether the respective first or second transfer apparatus is the transfer source apparatus or the transfer destination apparatus on the basis of the transfer information command,
wherein the at least one transfer destination apparatus is configured to send confirmation information to the transfer source apparatus after receiving the transfer information command from the host, and
wherein the transfer source apparatus is configured to, in response to receipt of the transfer information command, enter a standby mode in order to receive the confirmation information from the at least one transfer destination apparatus, and to start transferring the data to the transfer destination apparatus after receiving the confirmation information from the transfer destination apparatus.

2. The system of claim 1, wherein the transfer destination apparatus sends the confirmation information on the basis of the transfer source information in the TO address of the electronic message containing the transfer information command.

* * * * *